US008281026B2

(12) United States Patent
Lankford et al.

(10) Patent No.: US 8,281,026 B2
(45) Date of Patent: Oct. 2, 2012

(54) SYSTEM AND METHOD FOR INTEGRATION OF STREAMING AND STATIC DATA

(75) Inventors: Peter Lankford, Chicago, IL (US); Andrew MacGaffey, Carol Stream, IL (US)

(73) Assignee: Metafluent, LLC, Warrenville, IL (US)

( * ) Notice: Subject to any disclaimer, the term of this patent is extended or adjusted under 35 U.S.C. 154(b) by 394 days.

(21) Appl. No.: 12/225,059

(22) PCT Filed: Mar. 14, 2007

(86) PCT No.: PCT/US2007/006501
§ 371 (c)(1),
(2), (4) Date: Sep. 12, 2008

(87) PCT Pub. No.: WO2007/109087
PCT Pub. Date: Sep. 27, 2007

(65) Prior Publication Data
US 2009/0037514 A1    Feb. 5, 2009

Related U.S. Application Data

(60) Provisional application No. 60/783,369, filed on Mar. 18, 2006.

(51) Int. Cl.
*G06F 15/16* (2006.01)
(52) U.S. Cl. .......................... 709/231; 709/203; 709/246
(58) Field of Classification Search .................. 709/203, 709/231, 246
See application file for complete search history.

(56) References Cited

U.S. PATENT DOCUMENTS

| | | |
|---|---|---|
| 6,401,121 B1 | 6/2002 | Yoshida et al. |
| 6,633,914 B1 | 10/2003 | Bayech et al. |
| 6,671,259 B1 | 12/2003 | He et al. |
| 6,965,938 B1 | 11/2005 | Beasley et al. |
| 7,181,731 B2 * | 2/2007 | Pace et al. ..................... 717/136 |
| 7,200,675 B2 | 4/2007 | Wang et al. |
| 7,403,993 B2 | 7/2008 | John et al. |
| 7,512,686 B2 | 3/2009 | Berg |
| 7,546,369 B2 | 6/2009 | Berg |
| 7,620,687 B2 | 11/2009 | Chen |
| 7,649,876 B2 | 1/2010 | Berg |
| 7,698,398 B1 | 4/2010 | Lai |
| 7,702,739 B1 | 4/2010 | Cheng et al. |
| 7,747,678 B2 | 6/2010 | Mehra et al. |
| 7,814,470 B2 * | 10/2010 | Mamou et al. ................ 717/162 |

(Continued)

OTHER PUBLICATIONS

Mark Harper et al., "Java Message Service", Sun Microsystems; Version 1.1, Apr. 12, 2002, 138 pages.

(Continued)

*Primary Examiner* — Phuoc Nguyen
(74) *Attorney, Agent, or Firm* — Squire Sanders (US) LLP

(57) ABSTRACT

The invention relates to integration of streaming data. The invention provides a means for integrating both high-throughput streaming and static content originating from multiple types and/or instances of data sources into discrete units of data. The invention provides integration of a wide variety of disparate streaming and static data sources as well as deployment of content in multiple protocols, either static or streaming or both. In the preferred embodiment, the invention provides a method and system for the insertion of domain-specific implementations of the JMS (Java Message System) messaging paradigm into a server-based JMS provider infrastructure. A Content Integration Framework provides access to Content Instances. The Content Integration Framework is used by Distribution Adapters that expose content from Content Instances cached in the system using a variety of protocols.

31 Claims, 22 Drawing Sheets

U.S. PATENT DOCUMENTS

| | | |
|---|---|---|
| 7,831,693 B2 | 11/2010 | Lai |
| 2001/0016880 A1 | 8/2001 | Cai et al. |
| 2002/0154646 A1 | 10/2002 | Dubois et al. |
| 2003/0018694 A1* | 1/2003 | Chen et al. ............ 709/200 |
| 2003/0093470 A1* | 5/2003 | Upton ................... 709/203 |
| 2003/0105797 A1 | 6/2003 | Dolev et al. |
| 2003/0229900 A1* | 12/2003 | Reisman ................ 725/87 |
| 2004/0122892 A1 | 6/2004 | Brittenham et al. |
| 2004/0221261 A1 | 11/2004 | Blevins |
| 2005/0114753 A1 | 5/2005 | Kumar et al. |
| 2005/0228808 A1* | 10/2005 | Mamou et al. ........ 707/100 |
| 2006/0047751 A1 | 3/2006 | Chen et al. |
| 2006/0069717 A1* | 3/2006 | Mamou et al. ........ 709/203 |
| 2006/0123425 A1 | 6/2006 | Ramarao et al. |
| 2006/0129684 A1 | 6/2006 | Datta |
| 2006/0277413 A1 | 12/2006 | Drews |
| 2007/0043834 A1 | 2/2007 | Barnerjee |
| 2007/0086360 A1 | 4/2007 | Berg |
| 2007/0124362 A1 | 5/2007 | Kren |
| 2007/0191033 A1 | 8/2007 | Marais |
| 2009/0070489 A1 | 3/2009 | Lu et al. |
| 2009/0282149 A1 | 11/2009 | Kumbalimutt et al. |
| 2010/0070650 A1 | 3/2010 | MacGaffey et al. |

OTHER PUBLICATIONS

Mark Harper et al., "Java™ 2 Platform Enterprise Edition 1.4 Specification"; Sun Microsystems; Apr. 26, 2004, 59 pages.

* cited by examiner

400

1701 Step 1 Client requests [Server] permission to publish/subscribe to Destination 1702 Step 2 Server determines
        a) permission and
        b) eligibility of Destination for Optimization 1703 Step 3 If not eligible: then Client transmits message to Server w/o optimization; if eligible, go to step 4.

1704 Step 4 Message is optimized by the sub steps of:

a) Server determines that Client has Destination Specific Dictionary [DSD]
    b) Server sends DSD to Client Session;
    c) Client saves Destination specific dictionary for session-life
    d) Server sends reference to DSD for Destination
    e) Client uses reference to associate DSD with Destination
    f) Server sends message to Client using coding implied by dictionary as appropriate to DSD for the particular Destination
    g) Client interprets Server message using meta-data from DSD;
    h) Client represents meta-data message to JMS API as MapMessageObjects;
    i) Client transmits optimized message to Server; and
    j) Sever may send Client a new DSD followed y a reference to that DSD for some Destination.

SYSTEM AND METHOD FOR INTEGRATION OF STREAMING AND STATIC DATA

RELATED APPLICATIONS

This application claims priority from U.S. provisional application 60/783,369 of the same title and by the same inventors, filed Mar. 18, 2006, the entirety of which is incorporated by reference as if fully set forth herein.

BACKGROUND

1. Field of the Invention

The invention generally relates to the field of streaming data over a network and more specifically, the automating of business processes driven by real-time information.

2. Description of Related Art

Many integration systems for streaming and static data over a computer network or over the Internet exist already. Approaches may be found within several areas of integration middleware: extract/transform/load (ETL), enterprise application integration (EAI), enterprise information integration (EII), and domain-specific middleware like a financial market-data system or RFID middleware.

In the last decade, client server systems for static data integration have increasingly favored locating logic, to the extent possible, on the server rather than the client. Loading logic on the server lowers costs, shortens time to market, and reduces long-term risks. Integration vendors have continued this trend by introducing products that perform more integration on application servers and leave less to developers of client applications.

Current data integration systems do not provide for streaming data the same quality available for static data, nor for system integration of mixtures of streaming and static. Currently available integration products for streaming data force application developers to implement a great deal of logic related to content acquisition and transformation. This logic implementation costs application developers a great deal of time and money in both the short and long term. Moreover, to the extent that some streaming data integration products try to simplify the developer's task, such simplification is achieved by putting logic into the API (Application Programming Interface). However, putting logic in the API forces developers to use proprietary APIs and proprietary APIs become harder to maintain on a variety of platforms as the APIs evolve to incorporate more business logic.

What is needed is a flexible way for an integration system to acquire, transform, and distribute streaming data, as well as a means for the integration system to support standards (e.g. Java Message Service (JMS)). What is also needed is a means to shift the burden of content-integration from the client-side application to the server infrastructure.

Financial services firms have information intensive business processes that consume information from a large variety of sources, both internal and external. Much of the data they consume is related to activity in the financial markets and therefore updates continuously while the markets are open. These firms also generate information and distribute it within their enterprise and with external business partners.

A major financial services firm will develop hundreds or thousands of different software applications that consume, manipulate and perhaps publish data from one or more data sources. Each of these applications is designed to perform some specific business function ranging from graphical display for users to fully automated algorithmic trading.

Financial services application are typically complex, by virtue of interaction with multiple streaming and static data sources, as well as the rapid update of continually changing information. A large-scale application, for example, may consume data relating to hundreds of thousands of different financial instruments and absorb tens or hundreds of thousands of updates per second. Currently, proprietary technology (data integration systems) meets the specialized need of the industry, requiring high development costs; poor integration of the proprietary with the larger mainstream is a chronic problem.

Financial services firms must constantly improve their ability to exploit market place opportunity to remain competitive. Streaming data integration is critical. The ability of developers to rapidly provide new software to serve a data integration system is a vital aspect of preserving productivity and shortening time to market. What is needed is a standard data integration system permitting rapid product development and seamless integration with other data integration systems.

What is needed is a system and method for integration of streaming data that provides data virtualization, flexible transformation, customer-controlled (as opposed to vendor dictated or "proprietary") data models, and standards-based interfaces. Further needed are a method and system of simultaneously integrating multiple, disparate data sources, both streaming and static, as well as executing high-through-put, low latency deployment of data to subscribers (clients applications). And a data integration system providing dynamic tailorability of subscription permissions and improved resource allocation in service of deployment are needed.

SUMMARY OF INVENTION

The invention provides a system and method of streaming and static data integration providing rapid acquisition, transformation, and distribution of data and data-rich content.

The invention provides integration of a wide variety of disparate streaming and static data sources as well as deployment of content in multiple protocols, either static or streaming or both. A Content Integration Framework provides integration of data into Content Instances according to rules provided in Content Specification. The inventive Content Integration Framework provides specialized Content Adapters that can expose the properties and methods of any Component as content. In the preferred embodiment, content that has been translated into a schema is cached and may be integrated in-line. The Content Integration Framework provides Distribution Adapters that interact with the message oriented middleware, and deploy content from Content Instances cached in the Managed Content, through Distribution Adapters, where each distribution protocol has a dedicated Distribution Adapter. Client applications can subscribe to real-time streaming content or other subscription models.

Of course, in embedded configurations, no message-oriented middleware is used, and there are hybrid configurations as well. Once the Content Integration Framework and Component Framework are appreciated, the implementation of embedded and hybrid configurations are evident to those of skill in the related art. The invention further provides Content-based Permissioning, Content Linking, and Atomicity.

In the preferred embodiment, the invention provides a method and system for the insertion of domain-specific implementations of the JMS (Java Message System) messaging paradigm into a server-based JMS provider infrastructure. The preferred embodiment of the invention provides a pluggable JMS architecture, including: a modular and extensible mechanism to insert domain-specific implementations of the JMS messaging paradigm into a server-based JMS provider infrastructure (also referred to herein as a JMS server plug-in model). The preferred embodiment further provides a protocol optimized for streaming content management; and mechanisms for load balancing of content, supporting scalability of the system.

Co-pending patent applications by the same inventors entitled "JMS Provider with Plug-able Business Logic" and "Content Aware Routing of Subscriptions for Streaming and Static Data," elaborate embodiments of the inventive system and method taught herein. Both co-pending applications claim priority from U.S. provisional application 60/783,369, filed Mar. 18, 2006, the entirety of which and the entirety of the two co-pending applications are incorporated by reference as if fully set forth herein. The examples of the invention herein are as the invention applies to the financial services market. However, the invention may be implemented in other markets where high volumes of dynamic data, data integration, messaging and transactions are important.

The invention includes a networked and computer implemented system, and as can be appreciated by those of average skill in the relevant art, the invention includes a memory device capable of storing instructions to direct a computer, as well as apparatus operable to store, receive, and implement instructions from a memory device. The invention is not limited to the code language used, or to any hardware, software or firmware embodiment, but is intended to cover all manners of performing the invention, and configuring the inventive system.

BRIEF DESCRIPTION OF THE DRAWINGS

The present invention will be understood and appreciated more fully from the following detailed description taken in conjunction with the drawings.

FIG. 8 is a depiction of subscription initialization with a Mapping Plug-in.

FIG. 9 is a depiction of subscription initialization with the Managed Content Plug-in.

FIG. 15 illustrates a Mapping Plug-in.

FIG. 16 illustrates a Managed Content Plug-in.

FIG. 17 is a flowchart illustrating transfer protocol.

FIG. 18 illustrates a Re-direct Plug-in.

DETAILED DESCRIPTION OF THE PREFERRED EMBODIMENT

Introductory Remarks

Figure 1:
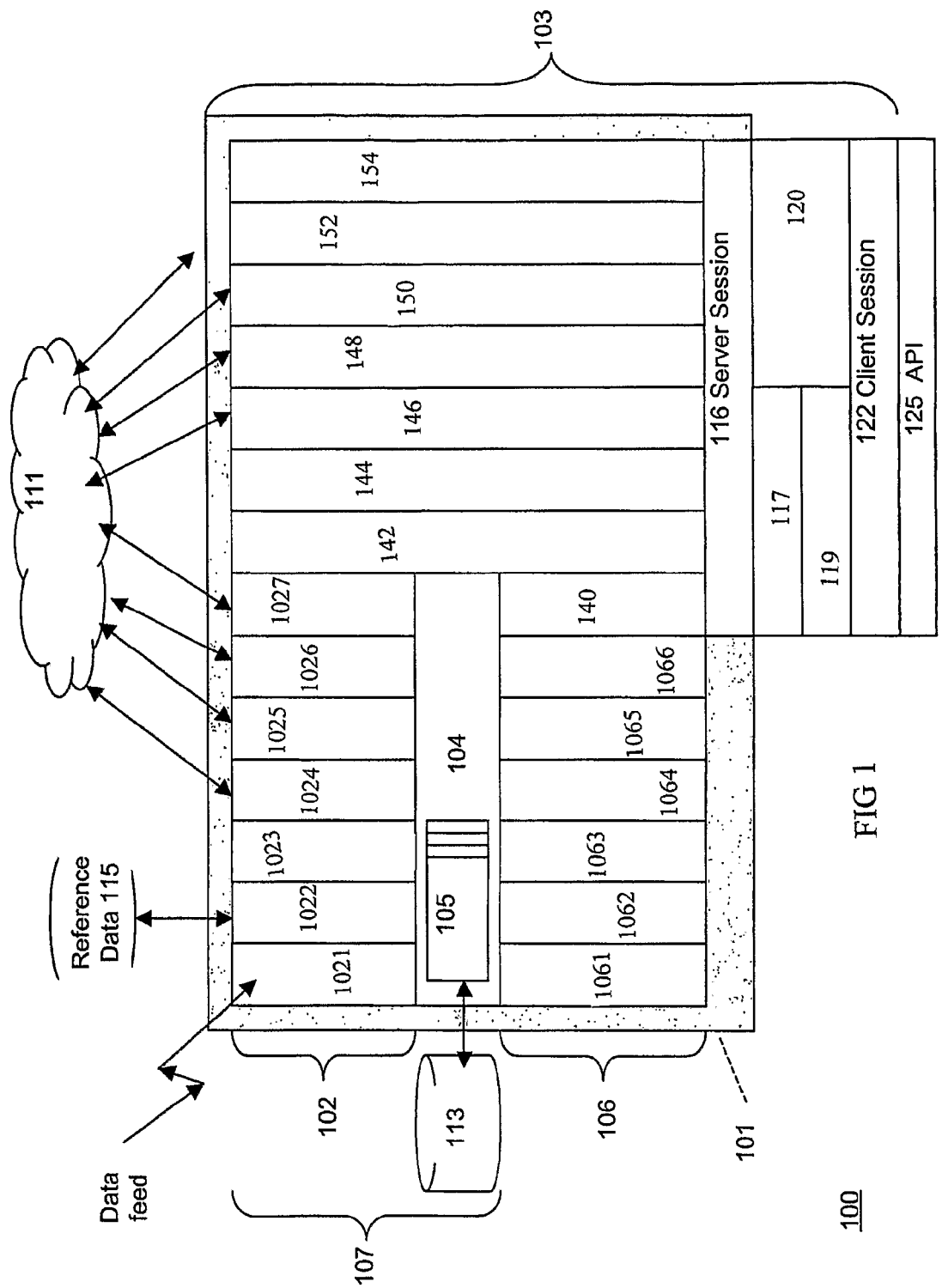
FIG. 1 shows the generalized architecture of a system according to the invention.

The inventive architecture of a client server system according to the invention is presented first, followed by an elaboration of a JMS API implementation as a preferred embodiment of the invention. Included in this discussion are inventive aspects (including plug-able business logic and content aware subscription routing), which are each the subject of companion patent applications in their own right.

For convenience of the reader, an effort has been made to discuss figures in the order presented as well as use of a numbering scheme permitting easy reference to inventive elements depicted in different figures. However, the drawings, figures and depictions are to enhance understanding and not to limit the invention. Defined terms are capitalized. Other terms have their ordinary meaning in the respective art, unless stated otherwise. Moreover, it is understood that the invention is not limited by the specifics of the particular implementation of the invention, including the coding language or configurations peculiar to such elective expressions.

Term usage and definitions. In describing the invention, many terms are used according to common usage and understanding: To aid in the understanding of the invention, we define a selection of terms used in describing the invention.

Application Context: The collection of Context objects used to allocate the Components for a given Client Application.

Atomicity: atomic change. (from database terminology meaning "all or nothing" for transactions). As used herein, atomic change is multiple changes to individual fields grouped as a discrete event associated with a larger unit of content. Example: the coupling of discrete data (e.g. "bid" and "ask" values) such that in the event of a change affecting one of the couple, updates downstream propagate only when both discrete data in the couple have been updated.

Chained Events: Events relating to Managed Content that are induced, within the scope of an atomic update event, by other changes to Managed Content, e.g. a mid-price is the mean of the "bid" and "ask" values and will change when either the "bid" or "ask" change.

Client Application: An application that interacts with the inventive architecture via some type of distribution protocol or programming interface, e.g. a JMS application or an HTTP application (browser).

Client Library: In a client-server JMS Provider architecture, the client-side library that implements the JMS API.

Client Network Session: In a distributed client-server implementation of the architecture, the client side manifestation of a network connection between client and server.

Client Session: The manifestation in the architecture of the JMS Session abstraction.

Component: an object; an instance of some class, or an object with references to other, closely related, objects. Simple components provide a specific type of service to other components; complex components combine many other components directly and indirectly to provide many different services and a high level of functionality. Example 1: a component may provide a simple encapsulation of a JDBC connection or even a pool of JDBC connections. Example 2: a JMS server implementation is a component that uses many other components to support remote JMS client applications. Components have a life-cycle, i.e. they need to be initialized when they are created and also need to know when to release any resources they use that are no longer needed. The component lifecycle is managed by the Component Framework.

Component Framework: A collection of software interfaces and associated implementations whose function is to assemble and initialize Components. The Component Framework manages component lifecycle, allocates and stores components for use by other components.

Content Adapter: A Component whose function is populating and maintaining fields/values in one or more Content Instances. A Content Adapter functions to interpret external data events and apply such external data event to such Content controlled by that Content Adapter.

Content-based Permissioning: function of application access control by comparing permission required for a particular Content Instance to permissions associated with the User credential (user identifier) supplied by application; multiple permissioning paradigms are supported as a permission paradigm is assigned to each Content Instance. Content Integration Framework provides the ability to authenticate on the basis of the Content Instance rather than on the basis of topics or names (as in, for example, standard JMS).

Content Cache: A set of Content Templates where each Content Template provides access to one or more Content Instances. (Also "Cache")

Content Instance: An object comprised of discrete primitive values or fields, which may refer to another Content Instance; a document; a unit of Content. A change in the state or the data associated with a Content Instance is an event.

Content Integration: using a Content Specification that blends data from multiple sources.

Content Integration Framework: In the abstract, the set of Components providing access to Managed Content with a Component Framework.

Content Life-cycle: A process driven by the Content Template comprising the procedure and supporting software interfaces by which a Content Instance is allocated, initialized, maintained or updated, and, finally, released.

Content Link: The run-time object that represents the link between one Content Instance and another.

Content Linking: A mechanism expressed in meta-data and also at run-time by which one Content Specification refers to another and such that Content Instances resulting from a Content Specification with linking meta-data contains a navigible link (Content Link) such that a Distribution Adapter can access data from an arbitrary depth of Content Instances linked in this manner. Content Linking allows the re-use of meta-data and the re-use of run-time resources.

Content Specification: Meta-data; a description used by a Content Template to define the structure of a Content Instance, and to initialize one or more Content Adapters. In the preferred embodiment, a Content Specification is an XML document.

Content Template: An object that uses a Content Specification and Content Adapters to create and maintain a Content Instance. A Content Template is "parametized" such that different parameter values allow for the creation of different Content Instances. A Content Template caches all Content Instances it creates. (Also "Template")

Context: An interface; part of the Component Framework providing access to Components; responsible for allocating, initializing and caching Components for use within the application.

Datafeed: A source of streaming data from an external system, e.g. a feed from the New York Stock Exchange (NYSE) or from the Options Price Reporting Authority (OPRA).

Data Model: a collection of Content Specifications as defined by a customer in a particular deployment of the architecture.

Distribution Adapter: A Component whose functions are to encode and distribute Managed Content to downstream applications and also to receive data publishing events from downstream applications and apply such events to Managed Content.

Event (Content Event): A dynamic change in the state or data associated with a Content Instance.

FAST: an acronym for FIX Adapted for STreaming; and FIX is itself an acronym for Financial Information eXchange protocol.

JMS: Java Message Service—a standard Java programming interface (see java.sun.com/products/jms/javadoc-102a/index.html).

JMS Provider: an implementation of the JMS standard.

Managed Content: Content accessed by means of the Content Integration Framework as Content Instances.

Mapping Plug-in: A JMS Plug-in whose function is to map publish and subscribe requests to other Plug-ins based on a configured set of expressions against which topic and queue names are matched.

Plug-able: Component-oriented implementations on a server; wherein dynamic configuration of Components permit flexible "plug-ing in" of different implementations of any given application server paradigm.

Plug-able JMS: Component-oriented implementations on a JMS API supporting simultaneous, different implementations of JMS functionality.

Plug-in: JMS Plug-in: A Component whose function is to provide a specific implementation of the JMS messaging paradigm. For example, the Standard JMS Plug-in provides a "typical" JMS messaging implementation, whereas the Managed Content Plug-in supports publish/subscribe access to Managed Content, and a Mapping Plug-in maps messaging Destinations to other Plug-in by partitioning the namespace of Destination names.

Reference Data: Static data relating to market data, e.g. information as might appear in an annual report.

Schema: a rule-set that governs how a type of data/content is specified. The rule set may be an industry standard, or, where no standard exists, defined by the system architecture. The preferred embodiment uses XML (eXtensible Markup Language) for specifications and XML Schema to define the rule set.

Server application: A collection of one or more Contexts and Components, where a Component is an object (an instance of some class) and a Context provides access to Components.

Server Network Connection: In a distributed client server manifestation of the architecture, the server-side manifestation of a network connection between client and server.

Server Session: A Component whose function s to support a Client Session by means of one.

Content Integration Overview

The Content Integration Framework provides a real-time transformation and caching capability that obtains data from external sources and transforms such obtained data according to a Data Model defined by an application developer. A Data Model comprises a number of metadata descriptions, or Content Specifications. Content Specifications are used to initialize Content Templates that in turn allocate and initialize Content Instances. The actual transformation of data is delegated by Content Templates to Content Adapters. A Content Template may rely on more than one types of Content Adapter—one for each different type of data source used to generate data for a given Content Instance. Over time, the primitive data values contained by a Content Instance may change. The Content Integration Framework provides the means for Content Adapters to apply these changes and to propagate them to downstream applications as update events.

Collectively, the Content Instances provided by a particular instance of the Content Integration Framework may update tens or hundreds of thousand of times per second.

Client Applications may access data from the Content Integration Framework using a variety of different protocols. For each type of distribution protocol, the architecture provides a different type of "Distribution Adapter." The function of a Distribution Adapter is to expose content and content-related events to interested client applications that use a particular distribution protocol. Distribution Adapters provide a mechanism by which data and/or events can be exchanged between the Content Integration Framework and downstream applications. The capabilities of different Distribution Adapters are largely a function of the underlying protocol and not all protocols have the same level of utility. Distribution Adapters can integrate with mechanisms including, but not limited to: a JMS server plug-in as in the current invention; standard JMS providers; proprietary messaging middleware, such as IBM WebSphere MQ and TIBCO Rendezvous; SOAP; Web Services Notification; http get/post; JDBC and ODBC interfaces; flat files; SMTP; SMS; SIP; JSP and ASP interfaces; relational databases; specialty databases, such as KX Systems KDB, VhaYu Velocity; Financial Information eXchange (FIX)/FIX Adapted for Streaming (FAST); proprietary market data systems such as the Reuters Market Data System, IBM WebSphere Front Office, and the Wombat Distributed Ticker Plant.

The Architecture

The invention as generally depicted in FIG. 1, a generalized framework for client/server systems, provides an architecture optimized for real time subscription to static and streaming data, content integration and distribution. The JMS implementation 100 receives input from a variety of streaming and static data sources including middleware 111 (e.g. market data systems, TIBCO RV, JMS, MQ Series) as well as reference data 115 and enterprise data (not depicted). As depicted in FIG. 1, a JMS implementation 100 of the invention provides a Component Framework 101. Within the Component Framework 101 a Content Integration Framework 107, including Content Adapters 102, Content Specifications 113, Content Templates 105, and Managed Content 104. The Content Adapters 102 (by way of example) include: Datafeed Adapter 1021; Database Adapter 1022; Analytics Adapter 1023; MDS Adapter 1024; MQ Series Adapter 1025; JMS Adapter 1026; RV Adapter 1027. The Component Framework 101 also includes Distribution Adapters 106. Examples of Distribution Adapters 106 are depicted including JDBC Distribution Adapter 1061; MQ Series Distribution Adapter 1062; MDS Distribution Adapter 1063; SMTP Distribution Adapter 1064; SOAP Distribution Adapter 1065; HTTP Distribution Adapter 1066.

The preferred embodiment includes JMS Provider 103, which can be understood to include the Component Framework 101 with the exclusion of the Distribution Adapters 106. The JMS Provider 103 is characterized by a modular architecture, comprised of a variety of plug-ins or modules which serve as extensible mechanisms to insert domain-specific implementations of the JMS messaging paradigm into a server-based JMS Provider infrastructure (also referred to herein as a JMS server plug-in model). Such plug-ins depicted include, by way of illustration, JMS Distribution/Content plug-in 140; Std JMS plug-in 142, Redirect plug-in 144; RV plug-in 146, JMS Plug-in 148; MDS Plug-in 150; MQ series plug-in 152; and Mapping Plug-in 154.

The JMS Provider 103 also includes a Server Session 116, a Server Network Connection 117, and a Client Network Connection 119. Further depicted in FIG. 1 are the embedded connection 120, the Client Session 122, and the JMS API 125.

The Component Framework 101 is a collection of software interfaces and associated implementations whose function is to assemble and initialize Components. The Component Framework manages component lifecycle, allocates and stores components for use by other components.

A Context typically will provide access to multiple Components. Initializing a Component entails setting the values of Component properties and resolving any required references to other Components. Those Components that need access to other Components or access to other types of resources (files etc) after the basic initialization process use the Context directly to acquire those resources as they are needed.

A Context provides access to Components by type and, optionally, instance. The Context is responsible for resolving references to abstract types and resolving those references to concrete types based on the run-time configuration. It is also possible to specify the name of different Context in which a request should be resolved. A Context may have a parent Context to which it will delegate any Component requests that it cannot satisfy itself. This means that Contexts, and the Components they contain, are organized in a nested hierarchy. Components provided by a parent Context are shared (visible to) by its child Contexts. The partitioning of the resource space into different Context instances, combined with the ability to nest one Context within another, provides the ability to define a particular "view" of the available Components. Within the architecture such a view is known as an Application Context. An administrator uses the Application Context capability to define different resource views for use by different client applications and/or users.

The function of the Content Template in the Content Integration Framework according to the present invention is described hereinbelow. The Content Integration Framework 107 provides a real-time transformation and caching capability that obtains data from external sources and transforms such obtained data according to a Data Model defined by an application developer. A Data Model comprises a number of Content Specifications.

The Content Integration Framework 107 uses Content Specifications (Specification) represented in XML. A developer creates these Specifications using off-the-shelf tools and deploys them as part of the run-time configuration for a product derived from this architecture. A Specification may identify data derived from one or more sources. It may also describe data derived by value-added calculations. The Content Integration Framework uses these Specifications to guide the assembly and transformation of raw data into an in-memory representation. Once transformed, the resulting data is available for consumption by customer client applications and business processes via various types of distribution protocols.

A Specification might, for example, describe the quote for exchange-traded instruments. Much of the data for such a quote would originate with the exchange. However, a firm might want to augment that data with additional values such as a risk metric sourced from a database, or it might include a calculated value such as a mid price (bid-ask median), or the spread (bid-ask difference), or, for an option quote, the calculated values of the parameters related to option pricing.

For each type of data that can be integrated into content there is a Schema: a set of rules that governs how that type of data is specified in XML. XML Schema is a standard for representing such a schema. In some cases the Schema used is itself an industry standard, e.g. Market Data Description Language (MDDL). Where no industry standard exists, the architecture defines a proprietary schema. A Content Specification may use elements from more than one Schema in which case elements from different schemas are distinguished by an XML namespace prefix. Off-the-shelf tools that understand XML Schema can be used to generate the Content Specifications. Specifications are typically stored in file but could also be accessed from other sources, e.g. a database, or via HTTP from some remote system.

The inventive architecture uses Content Templates 105 as the run-time representation of a Content Specification. The function of the Content Template is to manage the life-cycle of Content Instances, i.e. allocation, initialization, maintenance, and de-allocation. The initialization and maintenance of a Content Instance are delegated by a Content Template to one or more Content Adapters as determined by the Content Specification.

For each Schema used within a Data Model Content Specification there exists at least one Content Adapter 102 whose function is to obtain, transform, and maintain (keep up-to-date) the particular type of content governed by that Schema. The architecture provides the "structural" Components, key abstractions, data primitives, and lifecycle support mechanisms. Content Adapters "fill in the blanks" with their specific content—as defined by the Content Specifications. A Content Adapter is a Component, or, typically, a collection of Components and utility classes. Most Content Adapters need access to resources provided by other Components, e.g. a database Content Adapter will need access to a database connection that may be shared among multiple Components. These dependencies are resolved by the initialization mechanism of the architecture. It must be appreciated that a given Schema may have more than one Content Adapter capable of delivering content for that Schema. The configuration within the relevant Context determines which Content Adapter to use for a particular Content Instance. This flexibility provides the means to switch between data sources or data suppliers without changing the Data Model itself.

It can be appreciated that the ultimate function of the Content Integration Framework mechanism is to provide Client Applications with access to Content Instances. In the financial markets example, Content Instances that contain market data will typically update over time. Collectively, the Content Instances in a Content Cache may update tens or hundreds of thousand of times per second. Client Applications may be interested in the current value of the content, known as an image, and/or subsequent changes to the content, distributed as deltas, or "updates." Client Applications may also contribute content values to Content Instances; such values are visible to other applications and generate update events.

As Client Applications do not have direct programmatic access to the Content Instances, they access content via one or more distribution mechanisms or "protocols," such as JMS or HTTP and, depending on the protocol used, receive images and possibly updates. The architecture provides corresponding Distribution Adapters 106 for each type of distribution protocol. Distribution Adapters 106 map content and content-related events to and from a distribution protocol. The capabilities of different Distribution Adapters are largely a function of the underlying distribution protocol and not all protocols have the same level of utility. Some protocols support multiple interaction styles as well. Quality of Service can be on-demand (snapshot), Alert/notification; managed update or streaming (tick by tick) updates. Protocol interaction styles include request/response; session-oriented subscription; and persistent subscription.

Java Message Service (JMS) is an industry-standard programming interface for a message-based communication between client applications. A Client Application written to this standard should be compatible with any implementation of the JMS API, or, in JMS terminology, any JMS Provider 103. Briefly, JMS Client Applications exchange messages using either "topics" or "queues," each being a type of "destination." Topics provide the means for one or more message publishers to reach one or more subscribers in what is known as the "publish/subscribe" paradigm, where a message from a publisher goes to many subscribers. Queues provide a request/response paradigm as is typically used in a client/server relationship. Conceptually, a message sent via a queue goes to a single receiver, which may or may not respond to the sender, depending on the application-level protocol.

Plug-able JMS. The inventive architecture, system and method provide a JMS architecture that uses a component-oriented, or "plug-able," implementation of its server. The plug-able implementation supports simultaneous different implementations of the JMS functionality. For example, the inventive JMS implementation provides a plug-in that offers typical JMS functionality, as defined by the standard, in which applications send messages to one another using either the topic or queue messaging pattern. It also provides plug-ins whose function is to route JMS messages to and from other middleware infrastructures. This plug-in architecture also allows a JMS provider according to the invention to deliver certain application-level services and integration capabilities that would otherwise be impractical with typical JMS architectures, such as, in particular, providing a specialized plug-in that operates as a Distribution Adapter for real-time content.

The plug-in mechanism is also configurable, and extensible—meaning that the specific set of plug-ins deployed is determined at run-time and can be extended over time. Because the mapping of topic and queue names to plug-in implementation is configurable, developers or system administrators can manage the destination namespace and assign specific names or name hierarchies to a particular type of plug-in.

Another inventive aspect of the architecture is an ability to provide Application Contexts that are specific to a given type of JMS client application. A typical Client Application has at least an implicit dependency on a set of topics or queues (destinations) that it uses. It is also dependent on message protocols and message semantics associated with those destinations. A destination map and its plug-in configurations (adapter specifications, content definitions, etc.) therefore constitute a set of resources upon which a client application depends. All resources associated with client connections and sessions are allocated via a particular Context associated with the client session. The Application Context approach makes it easier to extend the functionality of the server while protecting existing client applications from change. The Application Context mechanism also provides the means to manage the allocation of key resources such as CPU and bandwidth to different types of client applications and deliver the throughput and latency characteristics required for each type of client application.

Several representative configurations of the inventive architecture are discussed hereinbelow. The preferred embodiment uses a JMS API and the term JMS Provider (also referred to as "Provider") means a representative implementation of the invention.

The JMS Provider 103 targets Client Applications that engage in publish-subscribe activities using real-time market data. Using standard JMS functionality and paradigms, Client Applications based on the inventive JMS Provider can access streaming market data via standard JMS topic subscriptions. Through a single topic, Client Applications can access content that may originate from one or more sources of both static and dynamic content, and may include inline analytics. Client Applications can also subscribe to complex collections (ordered or not) by various criteria. Using topics from the Provider, Client Applications can also publish content to other applications using the Provider and also to applications using other types of enterprise middleware or a dedicated market data system (MDS).

In the example provided herein, the Provider supports market data semantics such as image/update data streams and data condition advisories. In addition to market data publish-subscribe activities, Client Applications can also use standard JMS messaging functionality to interact with other applications.

From an implementation perspective, the Provider consists of a programming library—used by JMS client applications—and various server configurations. Servers represent a deployment of the Component Framework 101 including the Content Integration Framework 107 and some combination of Components that provide authentication and authorization, content and middleware integration, and distribution (using the inventive protocol depicted in FIG. 17). A Provider according to the invention can deliver high volumes of updating data using minimal CPU. It is horizontally scalable and supports various types of load balancing (content-aware routing) across servers to provide efficient use of system resources. Data architects and client application developers have full control over the data model and its representation in JMS; and can also manage the quality-of-service provided to a particular type of client application. Integrating content from new data sources is simple and may require no additional coding in the Client Application. IT managers manage run-time resources including underlying sessions and connections, CPU, memory, etc and make trade-offs between latency and throughput for different classes of Client Applications, as well as managing the underlying resources and data providers. Because Client Applications are insulated from naming and data model dependencies, systems administrators are free to choose between multiple data sources or vendors. The Provider offers both topic and content field-level access control for publish-subscribe activities. Reporting tools provide a full audit trail of publish/subscribe capabilities and activity. In alternate embodiments (not depicted) the architecture may be embedded, or of a hybrid character. Moreover, the use of the Content Integration Framework 107 is not restricted to JMS distribution.

In the preferred embodiment, a RMDS Value-Added Server (not depicted) comprising the Component Framework 101 and the Content Integration Framework 107 in conjunction with an RMDS Distribution Adapter, delivers advanced content integration capabilities to the installed base of RMDS applications. In its simplest form it serves as a feedhandler, providing symbology mapping and a customizable transformation of feed data to the RMDS data representation. It can also serve as a highly flexible analytics server that consumes data from various sources, including RMDS, and republishes integrated, value-added content to RMDS consumer applications. The Value-Added Server exposes content collections as RMDS marketfeed chains. Data architects and application developers have full control over the data model and its RMDS representation. New content and analytics can be added without programming. The Value-Added server integrates with DACS, the RMDS entitlements mechanism.

Further, the preferred embodiment includes a Notification Server (not depicted) that supports standards-based automated business process execution and other types of applications that do not require or cannot process high-volume market data The Notification Server comprises the Component Framework 101 and the Content Integration Framework 107 in conjunction with Distribution Adapters 106 suitable for low-volume notifications, such as an SMTP Distribution Adapter (for e-mail) and a SOAP (Simple Object Access Protocol) Distribution Adapter (for integration with web services-based process automation tools). The Notification Server provides the means to manage persistent subscriptions that identify criteria specifying the delivery of on-going or one-time notifications to applications that use SOAP or other similar protocols suitable for low-volume data notifications. The Notification Server also supports contribution via standards-based protocols such as SOAP. The Notification Server also benefits from the data modeling and resource management capabilities of the architecture.

The preferred embodiment also includes Web-Tier Components (not depicted) that support the development of web applications, including web services. The Web-Tier Components comprise the Component Framework 101 and the Content Integration Framework 107 in conjunction with standard web-tier technology such as a JSP (Java Server Pages) tag library that exposes scripted web-tier applications to content from the inventive architecture. Using the Web-Tier Components, HTTP-based applications can obtain snapshots of integrated content and also contribute data for consumption by other applications. These applications also benefit from the rich data modeling and integration capabilities provided by the architecture. Application developers have full control over the data resulting from HTTP requests and can specify XML representation or other formats such as CSV. As with the other permutations of the architecture, the Web-Tier Components provide field-level access control for publish-subscribe activities, along with audit trails, data modeling, resource management, enterprise architecture integration and system management capabilities.

Figure 2:
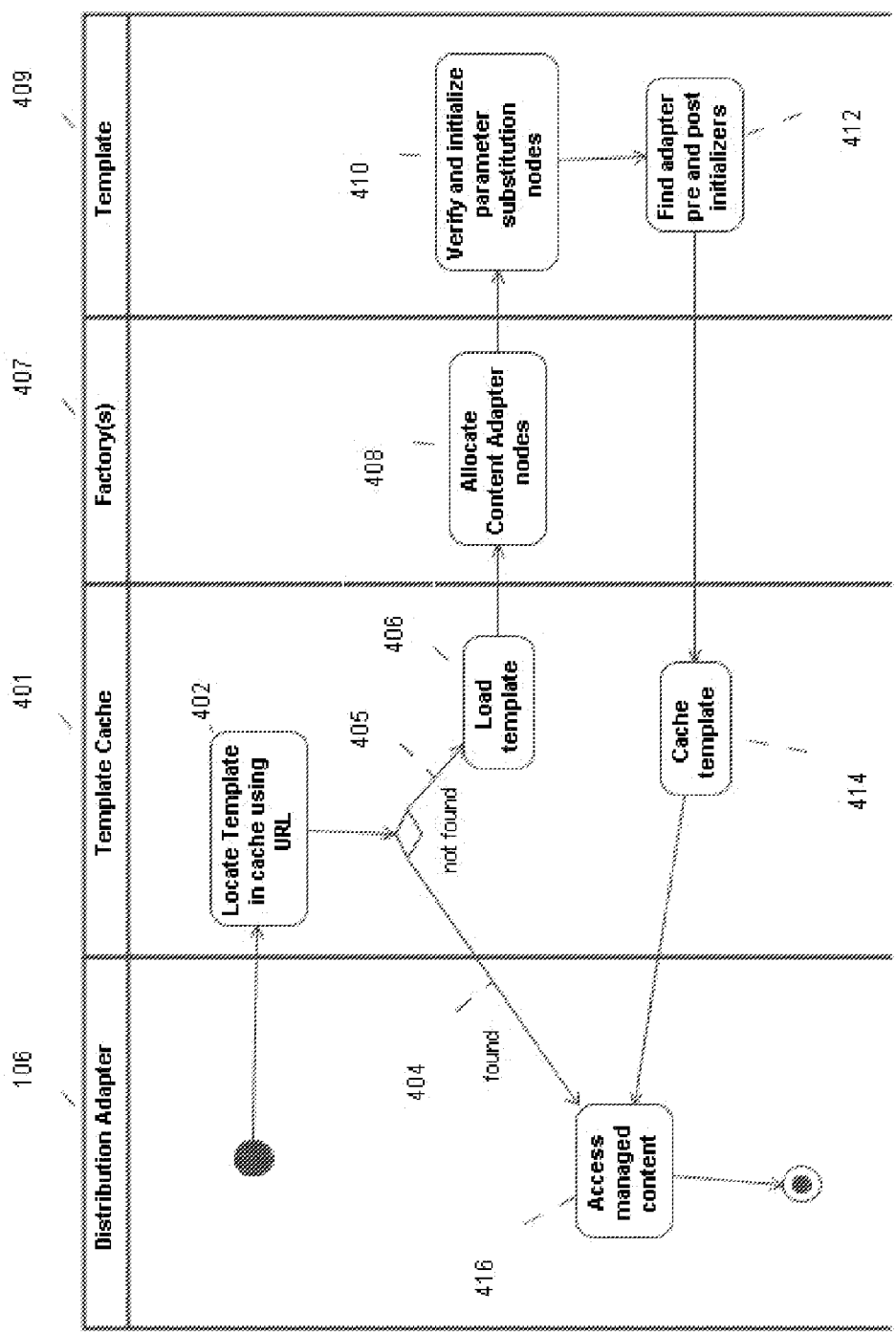
FIG. 2 represents the process of accessing a Template according to the invention.
Figure 3:
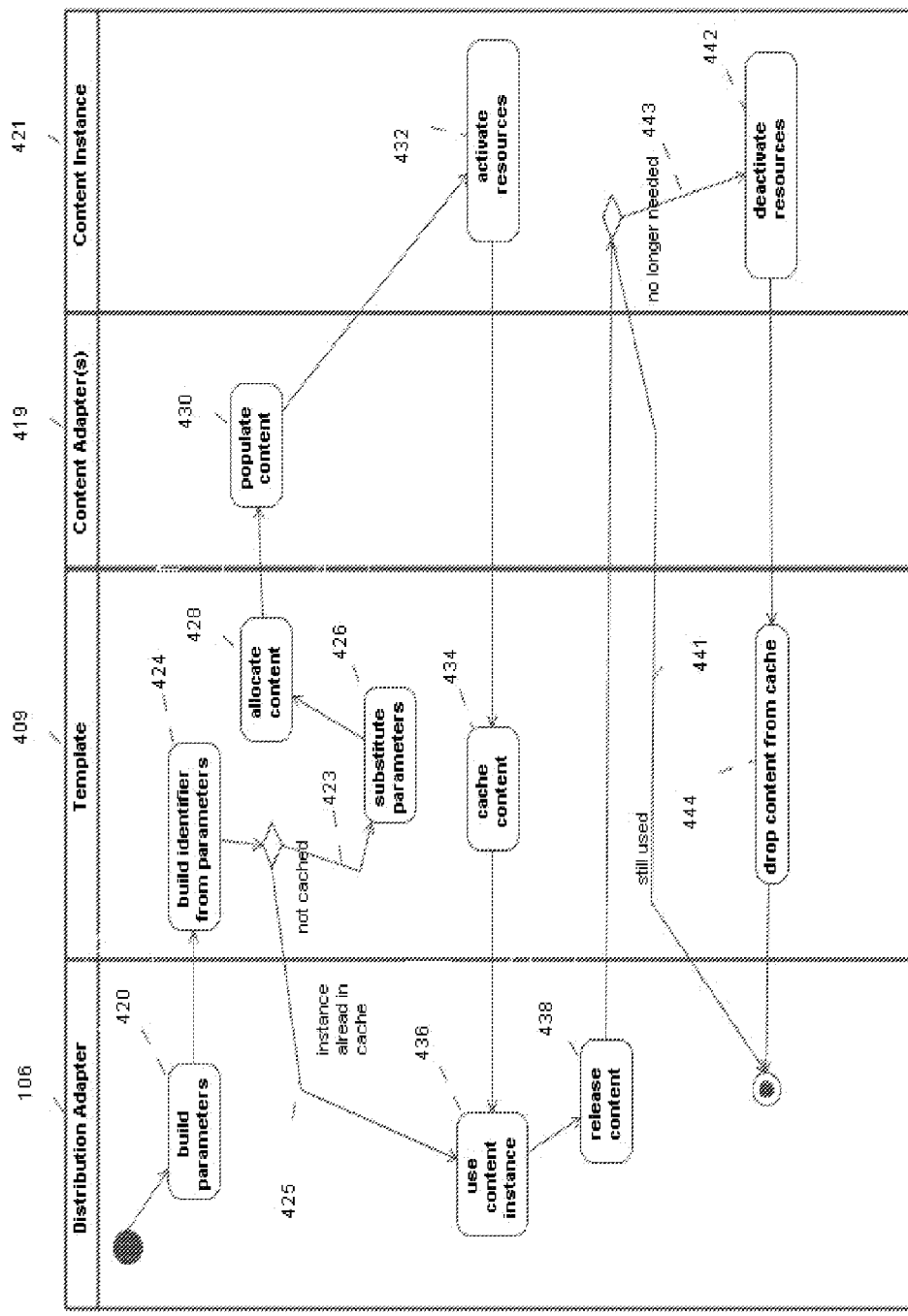
FIG. 3 represents access to a Content Instance.

To better understand how the inventive architecture provides Content Integration, it is useful to approach the system for the point of view of a task: in other words, how does a Client Application obtain the specific data it seeks? And further, how is the data obtained in a rapid and resource efficient manner? Further, as the invention provides a means to order incoming data events in such a way as to support "Atomicity" and "Chained Event" propagation," the discussion below explains methods integral to Managed Content. We explore the notion of template and, in particular, Content Templates in the inventive system and method. To better appreciate the method of streaming data Content Integration, an understanding of the method of template use from the point of view of accessing a Content Instance is set forth below. FIGS. 2 and 3 depict how a Distribution Adapter creates a Content Instance and accesses Managed Content (FIG. 1, 104); predicated upon the reader's basic understanding of messaging generally, and JMS in particular, as well as familiarity with the conventions of XML.

Each creation of a Content Instance by a Distribution Adapter 106 requires that, by means of the Component Framework 107, a Content Template be found, values obtained for the parameters required by the Template, the parameters used to substitute values into the substitution points in the Content Template, and delivery of an object to the Distribution Adapter. The Content Integration Framework 107 is agnostic as to distribution protocols. It bears emphasizing that the architecture according to the invention functions with any Content Adapter and exposes a Content Instance to a Distribution Adapter for any distribution protocol. FIGS. 2 and 3 inclusive depict the mechanisms by which Distribution Adapters access Templates and create a Content Instance according to the invention. Referring to FIG. 2, a Distribution Adapter 106 accesses a Template by first seeking to locate a Template 402 in a Template Cache 401. If a Template is found by the Template Cache 404 then the Distribution Adapter goes to Access Managed Content 416. If a Template is not found, then the following steps are executed prior to Access Managed Content 416: Template Cache loads Template 406, a Factory 407 allocates Content Adapter nodes 408; Template 409 verifies and initializes parameter substitution nodes 410 and finds pre- and post initializers 412; then caches Template 414.

In XML terminology, a Template may be thought of as having "nodes" where nodes are either "elements" or "attributes." Adapter nodes are part of the Content Adapter and function to push the data values into a Content Instance. Recall that for a given Template there may be many different Content Instances, each Content Instance from same Template having the same number and sequence of data values. The layout of values in a Content Instance is determined by a pre-order tree search of the Template wherein all nodes in the Template are assigned a numeric index. A feature of the index is a distinction between indexing of dynamic and static nodes. Adapter Nodes, nodes representing dynamic values--and therefore having a place in the Content Instance get an index of zero through "n." Other nodes referencing static values (such as those referring to template text, or comments) are assigned an index of "minus one" and do not require storage in the Content Instance (because the value for such nodes is common to all Content Instances and can be stored in the Template itself. For the purposes of humans and external tools using the inventive framework, the identification of nodes within a Template is accomplished using standard XPath expressions. It can be appreciated that, while storage must be allocated for all nodes, the single storage instance of static values results, at the high volumes of data for which the invention is most useful, save significant storage space. Moreover, the "look-up" for a particular node using an XPath expression need only be performed one time as its index is then known and can be supplied without further searching. Thus, as represented by FIG. 2, the access to a template according to the method taught herein saves time and space for the repetitive static nodes or attributes, and the indexing of dynamic content provides for speedier access to the data values in any Content Instance.

Referring now to FIG. 3, the method of a Distribution Adapter accessing, in Managed Content, a Content Instance, is described. From Managed Content (FIG. 1, 104) according to the invention, a Distribution Adapter accesses a Content Instance according to the method described below. The Distribution Adapter builds parameters 420; the design construct "template" builds identifier from parameters, and determines if the Content Instance is cached 424; if the Content Instance is cached, then the Distribution Adapter may go directly to "use Content Instance" 436; if not cached, then before proceeding to "use content instance" 436, the following occurs: the template substitute parameters 426, allocates content 428, the Content Adapters populate content 430; the abstraction "Content Instances" activates resources 432; and the template caches the content 434. After the Content Instance has been used, the content is released 438, and a determination made if the Content Instance is no longer needed 440. If not, i.e. needed. then proceed to finish 446; if so, i.e. no longer needed, the content interface deactivates resources 442, the template drops content from the cache 444, and then proceeds to finish 446.

In a Content Template, there are known "substitution points" as defined in a Content Specification, and such points are geared for creating some Content Instance from the Content Template. Parameters supply the values that will be substituted in one or more substitution points. A single value may be substituted in more than one point in a Content Template, and each parameter has a list of one or more substitution points to which it applies. Each substitution point defined in the Content Specification has an Xpath expression that identifies a specific location, or node, in the Template that results from the Specification, and therefore a specification location in the Content Instance that derives from the application of parameters to the Template. A set of values for the parameters applied to the Template is used by the Template to create a Content Instance. Parameterization according to the invention also provides for unique identification of Content Instances which are composed of data merged from more than one document. A given set of parameter values uniquely identifies the resulting Content Instance, i.e., a given set of parameter values applied to the same Template will always yield the same Content Instance.

Figure 4:
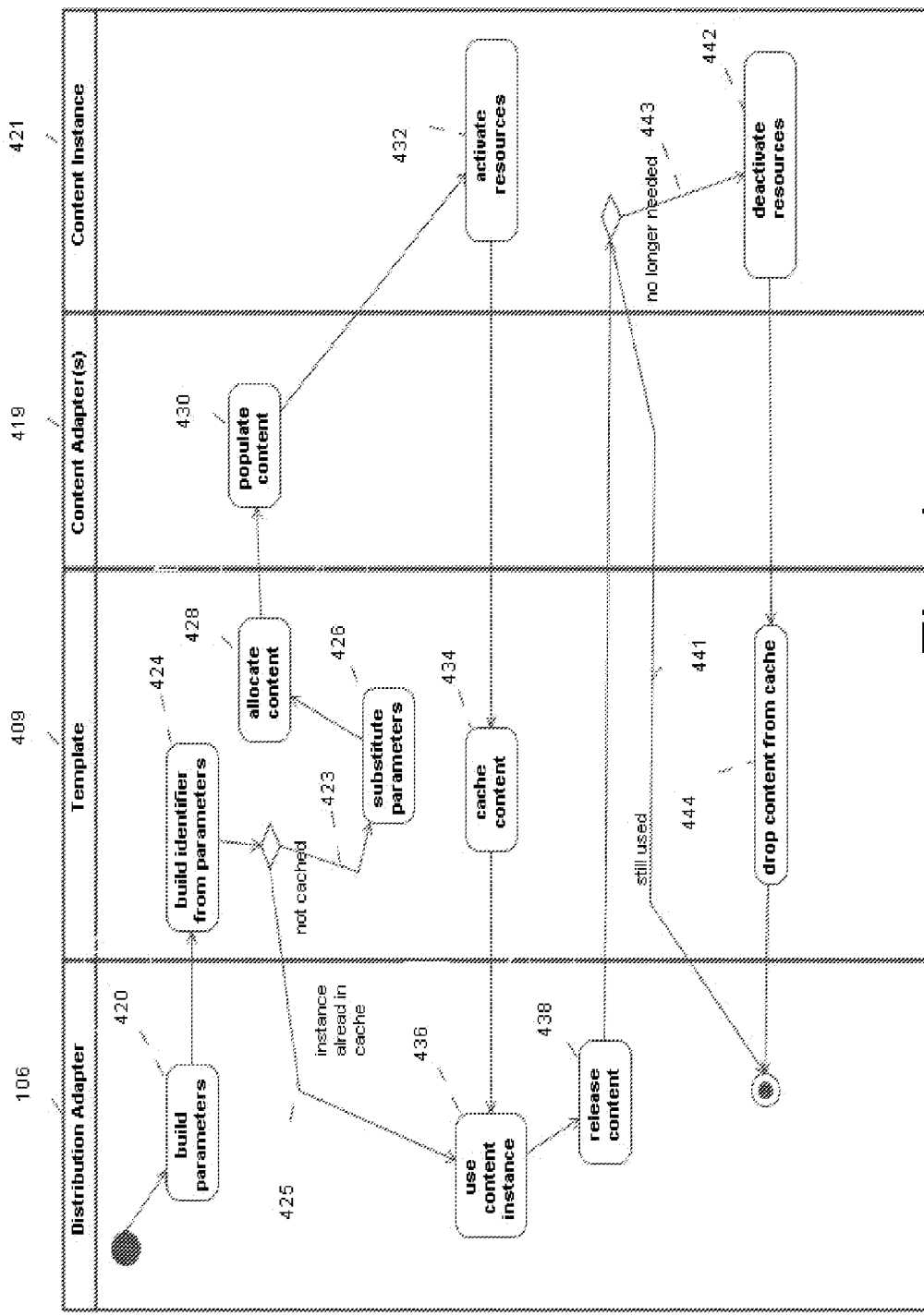
FIG. 4 represents the sequence of event handling.
Figure 4A:
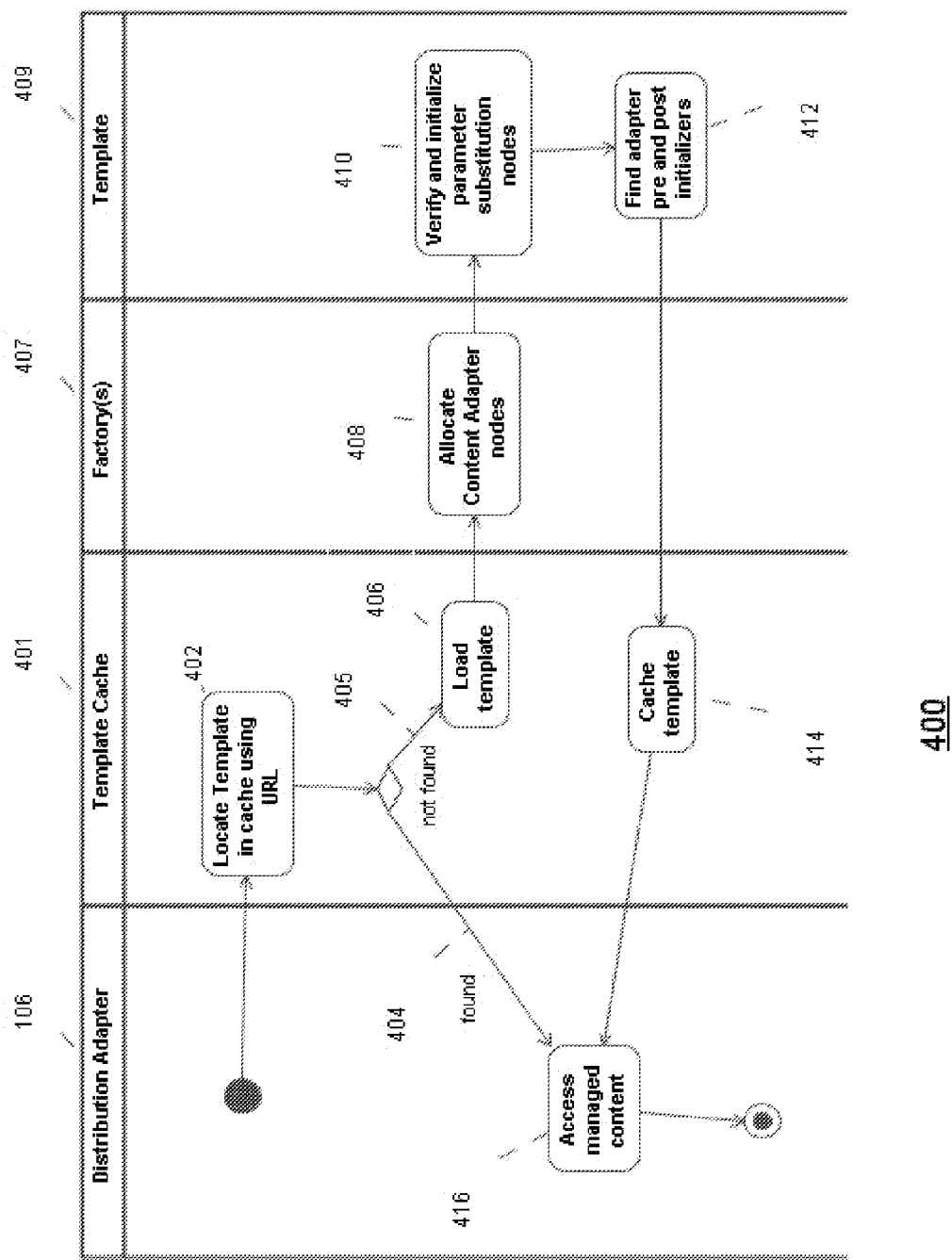
Figure 4B:
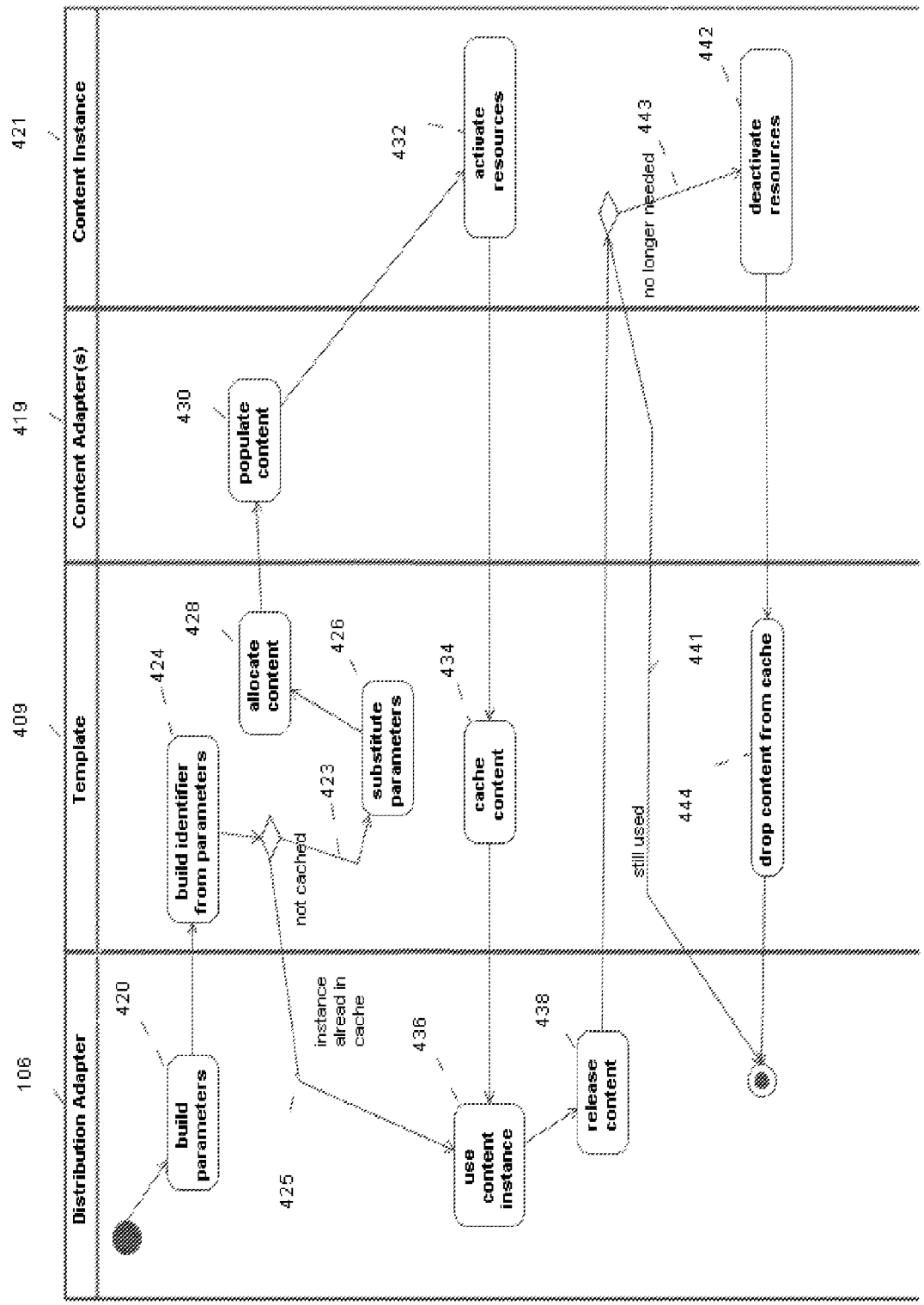
Figure 5:
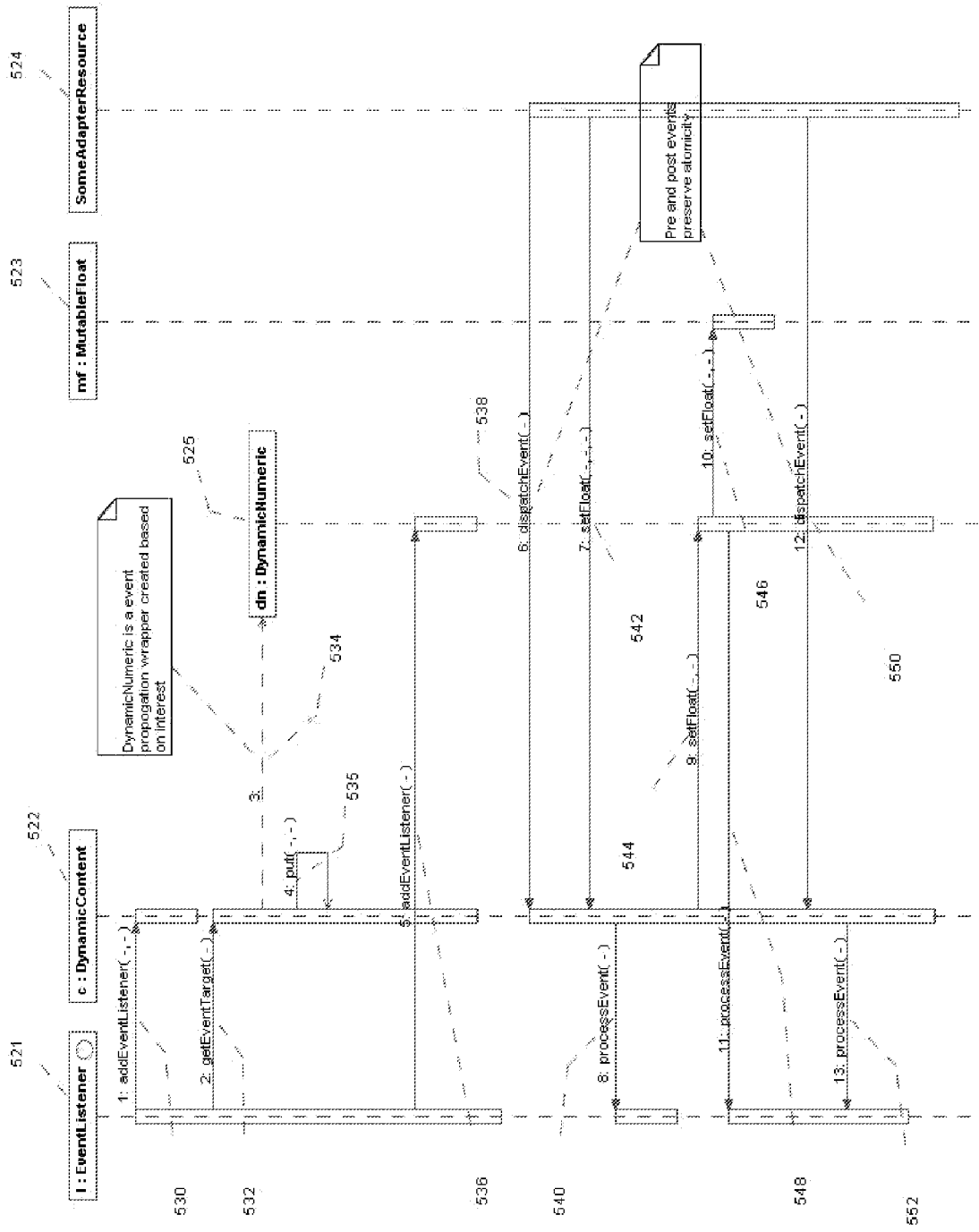
FIG. 5 depicts FIG. 4 in a UML sequence diagram showing setup and adapter event handling.

Event Handling According to the Invention. The invention provides a method for handling data events, both events for an external source such as market datafeed, and internal analytics, e.g. events generated in the Data Model by means of some transformation of data, so as to preserve Atomicity and data integrity or consistency. It does this using Chained Event propagation. FIG. 5A4 represents generally the sequence of event handling according to the invention, and illustrates the manner in which the Content Integration Framework interacts with an example of a Distribution Adapter to affect event handling. Receive data event from external source [content adapter] 502; Generate "pre-event" [Content Adapter] 504; Pass pre-event to "registered listeners" [Content Instance] 506; Prepare for event handling [Distribution Adapter] 508. Here, in the case illustrated, the Distribution Adapter performs as intended, e.g. Modify field values [Content Adapter] 510; Set values and generate events as required for "registered listeners" [Content Instance] 512; Encode data for field-level events [Distribution Adapter] 514; Generate post-event [Content Adapter] 516; Pass post-event to registered-listeners [Content Instance] 518; and then function accordingly, which, in this case is to Distribute resulting data-message [Distribution Adapter] 520. In general terms there is preparation for the function of the Adapter, FIG. 5 depicts FIG. 4 in a UML sequence diagram showing setup and adapter event handling. The process of event handling as in claim FIG. 4, further including the steps of: Adding an event listener 530; Getting event target 532; Wrapping to ensure chained-event propagation 534; Adding an Event listener 536; Dispatching pre Event 538; Processing Event 540; Set Float 542; Set float {dynamic content--dynamic numeric] 544; Set float {dynamic numeric--mutable float] 546; Process event [dynamic numeric--eventlistener] 548; Dispatch post event 550; Process event 552.

Figure 6:
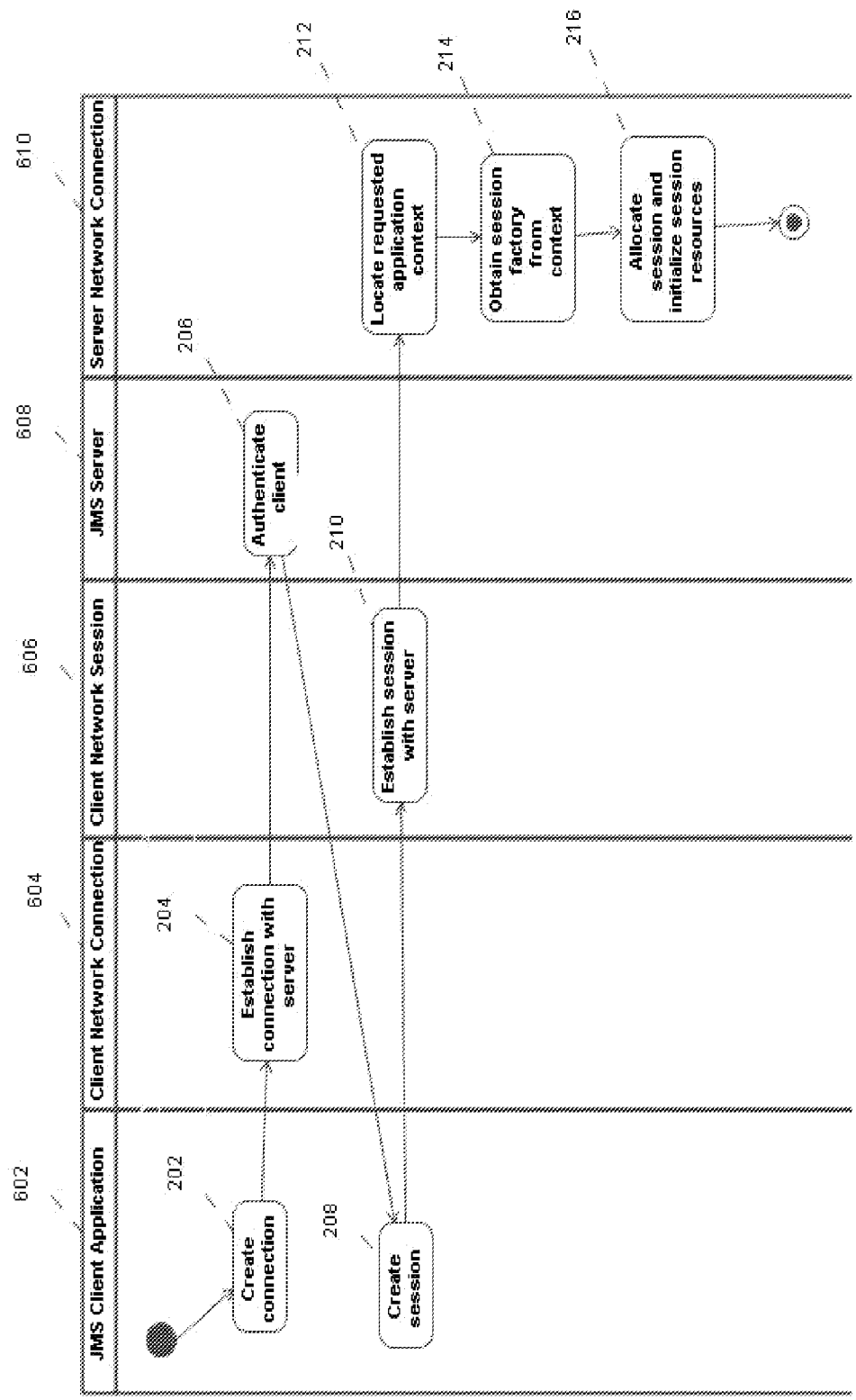
FIG. 6 depicts session initialization.

FIG. 6 depicts session initialization according to the invention, comprising the steps of: creating connection) JMS application 202; establishing connection with server (client network connection) 204; authenticating client (JMS server) 206; creating session (JMS client application) 208; establishing session with server (client network session) 210; locating requested application context (server network connection)

212; obtaining session factory from context (server network connection) 214; allocating session and initializing session resources 216.

Figure 7:
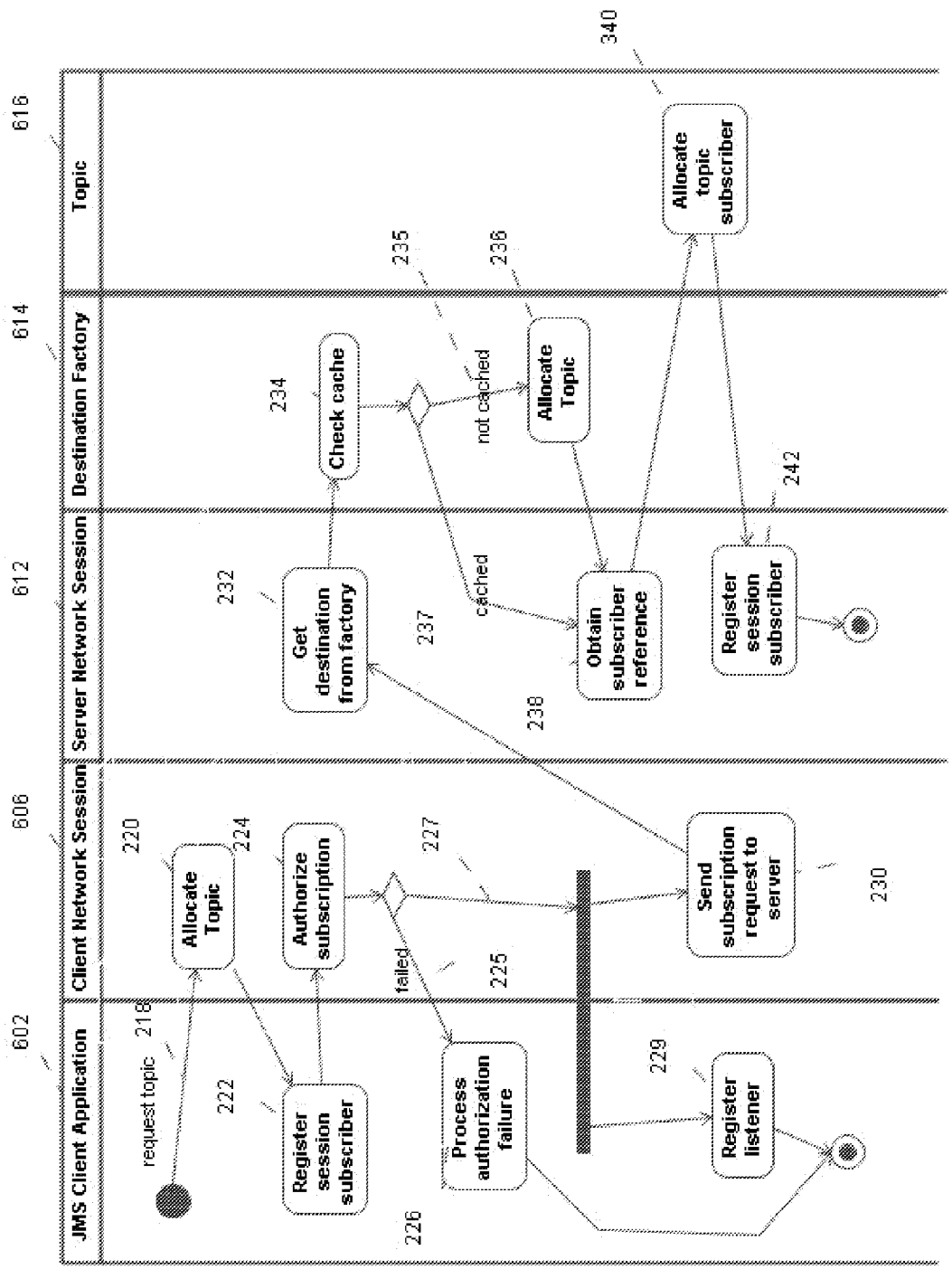
FIG. 7 is a generalized depiction of subscription initialization.

FIG. 7 is a generalized depiction of subscription initialization, comprising the steps of: requesting topic (JMS Client Application) 218; allocating topic (client network session) 220; registering session subscriber (JMS Client Application) 222; authorizing subscription (client network session) 224; determining process authorization failure (JMS Client Application) 226; if failure, then ending 228; if process authorized, then: registering listener (JMS Client Application) 229 and then ending 228;
or sending subscription request to server (client network session) 230; getting destination factory (server network session) 232; checking cache (destination factory) 234; if not cached, allocating topic (destination factory) then proceed 236; if cached, obtaining subscriber reference (server network session) 238; allocating topic subscriber (Topic) 240; and registering session subscriber (server network session) 242.

Figure 8:
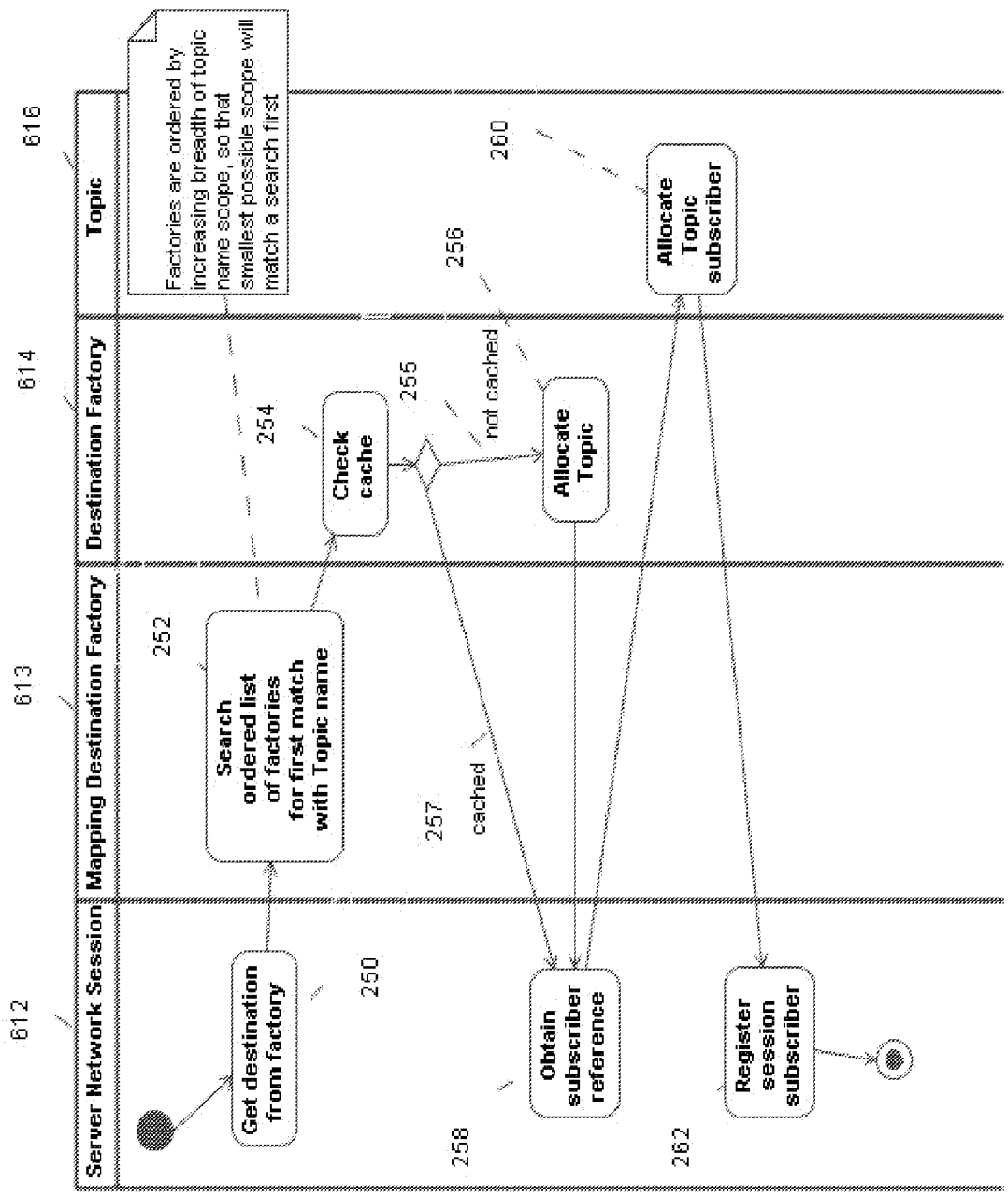

FIG. 8 is a depiction of subscription initialization with a Mapping Plug-in. Subscription initialization with Mapping Plug-in where the method provides for performance of the steps of: Getting destination from factory (server network session) 250; Searching ordered list of factories for first match with topic name (Mapping Destination Factory) 252; Checking cache (destination factory) 254; If not cached, allocating a topic (destination factory) 256; Obtaining subscriber reference (server network session) 258; Allocate topic subscriber (Topic) 260; Register Session Subscriber (Server network session) 262.

Figure 9:
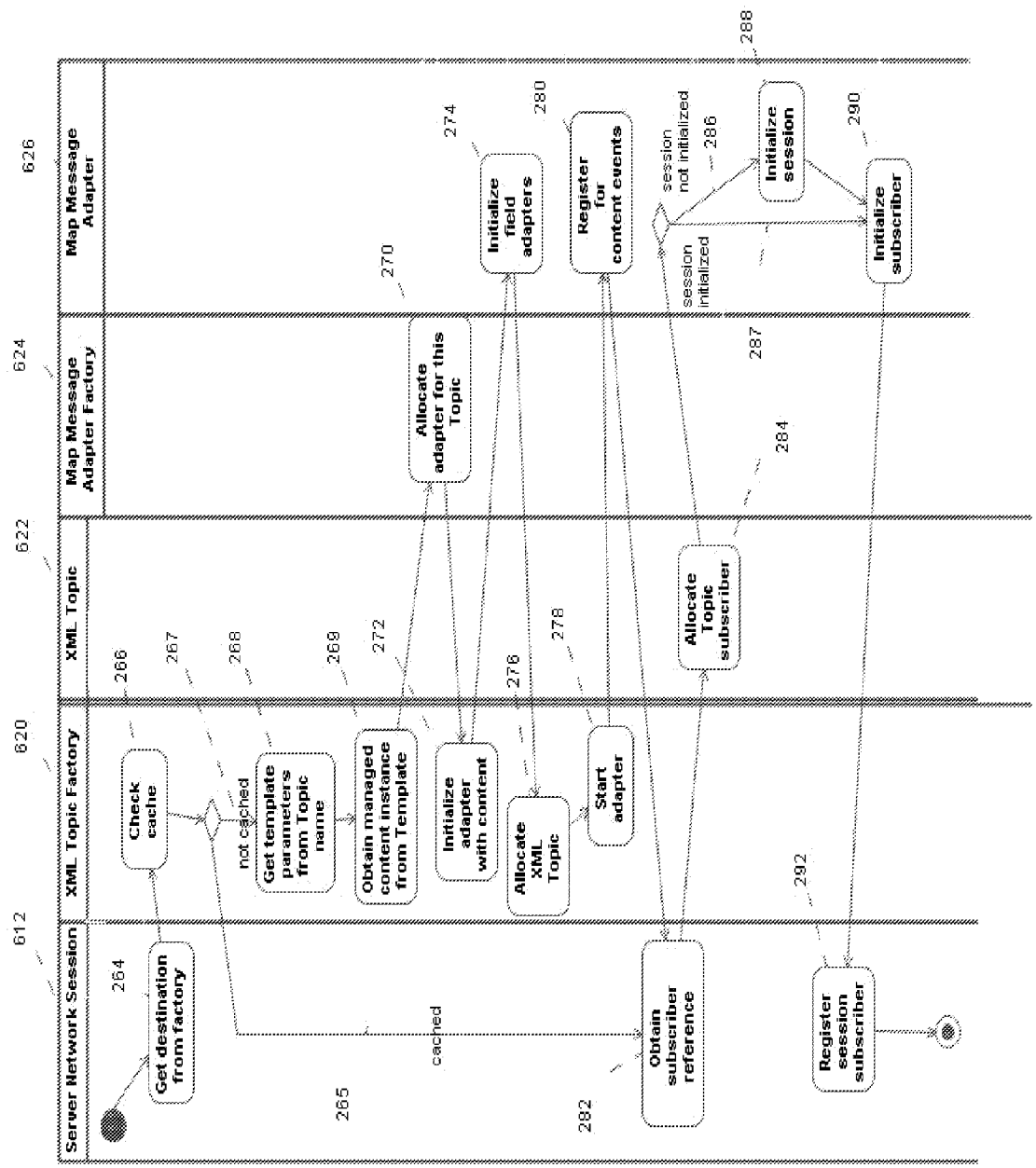

FIG. 9 is a depiction of Subscription Initialization with the Managed Content Plug-in according to the invention; where the steps are as follows: Get destination from factory (server network session) 264; Check cache (XML topic factory) 266; If not cached, Get template parameters from Topic name (XML topic factory) 268; Obtain Content Instance from template (XML topic factory) 269; Allocate Adapter for this Topic (MapMessageAdapter Factory) 270; Initialize Adapter with content (XML topic factory) 272; Initialize field adapters (Map Message adapter) 274; Allocate XML topic (XML topic factory) 276; Start Adapter (XML Topic Factory) 278; Register for Content Events (Map Message Adapter) 280; Obtain subscriber reference (Server Network Session) 282; Allocate Topic subscriber (XML Topic) 284; Determine session initialized (Map Message Adapter) 286; If not initialized, Initialize Session (Map Message adapter) 288; Session Initialized (Map Message Adapter) 290; Register Session Subscriber (Server Network Session) 292.

Logical View of the Preferred Embodiment

The invention is discussed hereinbelow from a logical view, discussing various design packages according to the preferred embodiment. Select figures are presented for illustration as an aid to understanding. It can be appreciated, however that the text should be sufficient for the practitioner of average skill in the programming art.

Utilities. In the preferred embodiment a package provides utility interfaces and classes to manage the propagation of events between event sources various types of event listeners. Event class is the base type for different kinds of events. EventListener (see FIG. 14, 1440) interface represents a Component interested in receiving events from some event source. EventTarget interface represents a source of events and provide methods by which instances of EventListener register and unregister for events. EventDispatcher class provides an implementation of an event dispatching mechanism. Typically an implementation of EventTarget will delegate listener registration and event dispatching to an instance of EventDispatcher.

ChainedEventTarget abstraction represents an EventTarget that generates an event based on an event received from some other EventTarget. ChainedEventDispatcher class provides the means to propagate chained events. The package includes two "Wrapper" classes. ExecutorWrapper class is a wrapper around an instance of java. util. concurrent. ThreadPoolExecutor. The wrapper is a configurable Component exposed for management with JMX. By virtue of being a Component it allows an executor to be shared among multiple Components. TimerWrapper class is a wrapper around an instance of java. util. Timer. It allows a timer instance to be shared among multiple Components.

A security package provides utilities for authentication. DefaultPrincipal provides a simple implementation of the standard javasecurity.Principal abstraction. DefaultLoginModule provides a simple implementation of the javax.security.auth.spi.LoginModule abstraction that requires a user name for identity but performs no authentication. Also, a package provides abstractions and utilities for authorization and the SubjectAccessController interface represents the base abstraction for access control mechanisms that check permission grants for a particular instance of javax.security.auth.Subject.

Component Framework. The "context" package provides the base abstractions used in the Component initialization mechanism. The ActiveComponent interface represents Components that require explicit initialization and release via start( ) and stop( ) methods. The Prototype class provides the basic implementation for class-specific initialization and comprises a collection of Property instances. A Prototype for a given class is capable of initializing a single instance of that class, i.e. it contains the appropriate property values for a particular instance. Multiple instances of Prototype are required to initialize multiple target objects. The Property class provides the basic implementation for setting various types of individual properties of an object that will be modified during the initialization process. The BooleanProperty, DoubleProperty, FloatProperty, IntegerProperty, LongProperty, StringProperty, and ShortProperty are extensions of the base class that correspond to properties having simple Java types. For properties that have other types, e.g. any other Java class, a Prototype will use its containing context to create a Prototype for an object of a suitable type. Exactly how the context does this depends on its implementation. Note that object instantiation is distinct from Prototype instantiation—objects are only created when specifically requested. The context interface is the primary point of access to this Component Framework and provides the means to obtain either prototypes or fully initialized objects. Users of this interface obtain either prototypes or objects from a Context by specifying the required class and, optionally, instance identifier and context identifiers. The prototypes perform the actual setting of properties and retain a reference to the object instances they allocate and initialize. A context will cache prototype instances once created and is therefore also a cache of Component objects.

Optionally, requests for objects are first directed to the parent and then satisfied within the local context. This provides the means to define a hierarchy of shared object instances. Initialization by a Prototype is recursive in that it will set values of simple properties and also instantiate and initialize properties that are complex types. A Context can also satisfy requests for arbitrary resources return in the form of a java.io.InputStream. A Context is itself a Component and implements the ActiveComponent interface. The implementations retain references to any instantiated descendants of ActiveComponent and invoke the stop( ) method of those objects when the stop( ) method of Context is invoked. This provides the means to terminate a server application.

The AggregateContext implementation of Context is a collection of other instances of Context. If a request does not specify a particular Context, then all sub-Contexts are queried, or polled, until the request is satisfied. In effect, it represents a search path in which to find a requested prototype or object. Typically, an AggregateContext is used as the topmost Context in a server application.

The SimpleContext class provides a basic implementation of the Context abstraction. A SimpleContext has a parent (an AggregateContext) to which it forwards all requests. The parent will poll this context, and others, for prototypes and objects. Based on these requests, a SimpleContext builds a cache of Prototype instances. If a SimpleContext is initialized with a reference to a LicenseServer and a requested object implements the LicensedComponent interface, then a license for that Component will be requested from the LicenseServer. The Context will throw an Exception if a license is not granted. To ensure that a SimpleContext has properly initialized an object, external validation is required. Setting the validatorFactory property of a SimpleContext optionally enables this behavior.

The PropertyValidator interface represents the base abstractions for Prototype validators. Given an instance of Prototype, the validator will check that all-required properties are set and that they have suitable values. The PropertyValidatorFactory interface represents the base abstraction for factories that provide instances of PropertyValidator.

The com.tbd.context.xml package provides an implementation of the property injection mechanism based on XML-encoded files. The XMLPrototype implementation of the Prototype abstraction uses data from an XML file to initialize an object. The file syntax supports default properties as well as properties specific to a named object instance. Objects for which the default file syntax is not sufficient may be initialized using customized implementations of XMLPrototype (see below). The XMLContext implementation of the Context abstraction satisfies requests for objects by creating either an instance of XMLPrototype or an instance of a class-specific specialization of XMLPrototype to interpret and apply an XML property file containing initialization data A class-specific prototype takes precedence over the generic prototype. An XMLContext is initialized with a directory name where it will search for XML property files. For example, when an object of class com.tbd.pkg.Foo is requested, an XMLContext searches a directory for an XML file with the fully qualified class name and an ".xml" suffix, e.g. "com.tbd.pkg.Foo.xml." If it finds such a file, an XMLContext will try to instantiate a prototype with the class com.tbd.pkg.FooXMLPrototype. If not successful, it will create a generic prototype of class com.tbd.context.xml.XMLPrototype. Whichever type of prototype is created, it will be used to interpret the file and initialize the requested object. The XMLAggregateContext implementation of AggregateContext can allocates instances of XMLContext on demand. It requires a directory under which can be found. sub-directories for each sub-context.

The com.tbd.application is a server application is an arbitrary collection of Components that combine to provide the required functionality. The Application class represents the starting point for a server application. It implements the ActiveComponent interface and also exposes itself as a JMXMBean. An Application is a collection of other ActiveComponent instances. The ApplicationMBean interface defines the methods and properties of an Application that are exposed for management via JMX. The ApplicationXMLPrototype is a specialized implementation of XMLPrototype initializes an instance of Application with an arbitrary list of Components.

The Content Integration Framework (com.tbd.dcontent.model) package defines the abstract interfaces that comprise the primitive constructs of the Data Model. This is comprehendible by anyone with an understanding of XML DOM Document Object Model) API. Node is the base abstraction for elements in the Data Model. Every node has an "id"—a numeric identifier—which, if greater than 0, is unique within a document and serves as an index into an instance of InstanceContent. NamedNode interface represents types of Node that can be identified by name in the context of their parent. The name of a node is qualified by a namespace. Namespace consists of a URI and a prefix (a short string used within a particular Document as an alias for the URI). Element interface is an extension of NamedNode that is the main structural component of content in a Document. An Element can be a child of another Element, may have Element children, may contain one or more Text children, and may have one or more Attribute children. The name of an Element is called the "tag name." Element tag names must be unique within a namespace but a Document may contain more than one Element with a given tag name may includes elements from multiple namespaces. Attribute interface represents the attributes of an Element. An Attribute has a name and a value and a parent of type Element. The name of an attribute is qualified by a namespace. Text is the abstraction for nodes within an Element that contain only text. The parent attribute of a Text instance is always an Element. TextElemen is the abstraction for types of Element that, conceptually, have a single child of type Text. This abstraction supports optimizations of memory usage that rely on this constraint. Comment is commentary, notes in text. The ProcessingInstruction interface represents a processing instruction (PI). A PI is basically some text whose contents are application-specific. A PI differs from a comment in that it has a label or "tag" name.

Document Document is an abstraction representing a unit of content (Content Instance). A Document comprises a hierarchical set of nodes with a single root element and, optionally, one or more comments or processing instructions. The root element may contain attributes, other elements, comments, or processing instructions, and so on. The contents of a Document can be traversed hierarchically by access the root element, the children and attributes of the root element, the children and attributes of the child elements, and so on. Elements and attributes within a Document can also be accessed, or selected, using a standard XPath expression. InstanceContent is an abstraction representing containers that store the actual data contained in a particular instance of a Document implementation. Values stored in an InstanceContent are indexed by node id.

The com.tbd.dcontent.document package provides the primitive implementations of the abstractions in the Data Model. NodeImpl is a base class for various types of Node. NamedNodeImpl is a base class for various types of NamedNode. Namespace is a class that encapsulates a namespace and namespace prefix. ElementImpl is a base class for various types of Element. SimpleElement is an intermediate abstraction for implementations of Element that contain only text, i.e. have no other children. TextElementImpl is a concrete implementation of SimpleElement. AttributeImpl is an implementation of Attribute. DocumentImpl is an implementation of the Document abstraction. Text is a class representing text found within a mixed element, i.e. an element with both other element children and text. CommentImpl is an implementation of Comment. ProcessingInstructionImpl is an implementation of ProcessingInstruction.

Figure 10:
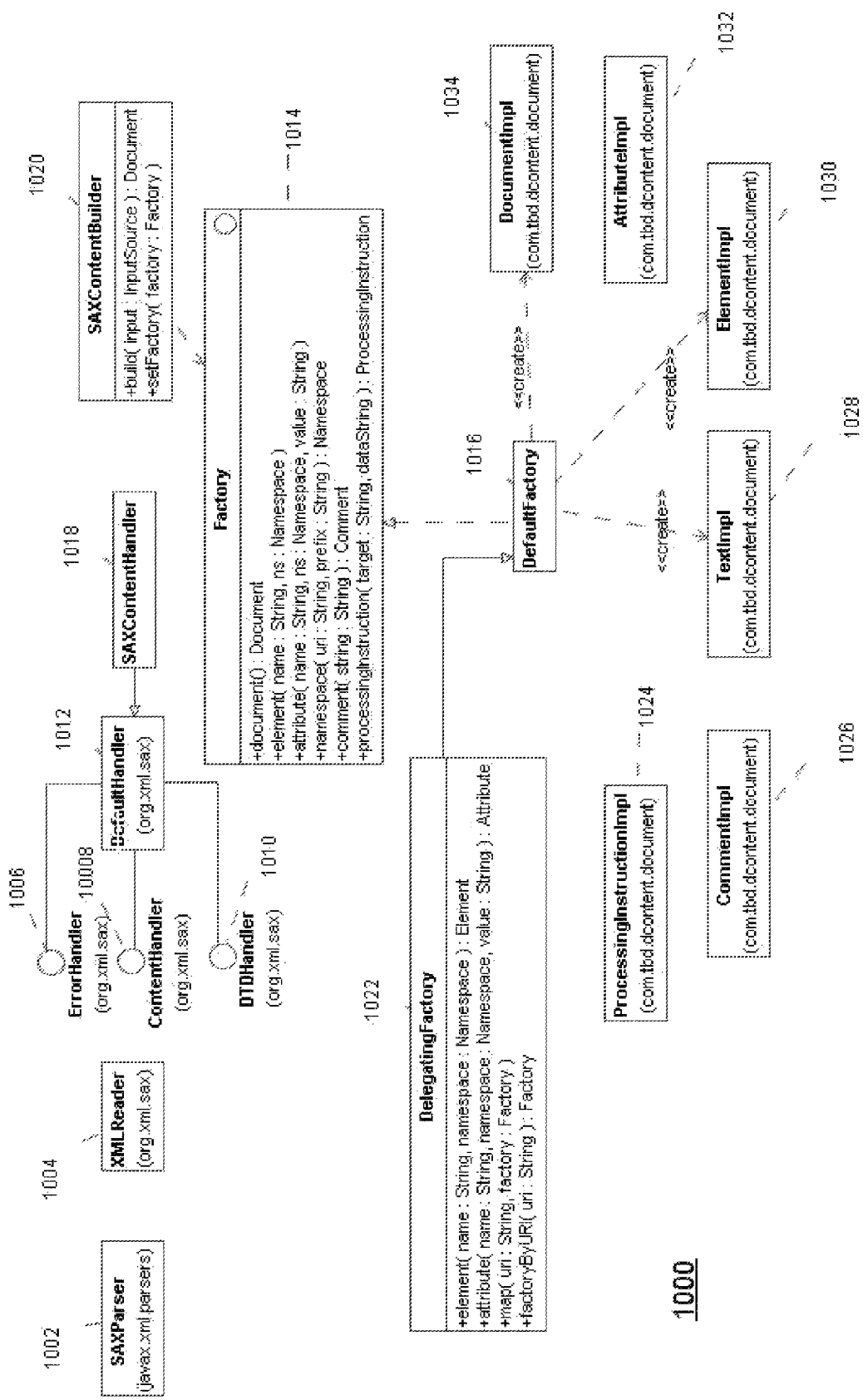
FIG. 10 illustrates the Factory construct.

Referring to FIG. 10, the package com.tbd.dcontent.sax 1000 illustrates the "Factory" Construct, which provides the classes that parse an XML file to instantiate the in-memory representation as a Document. SAXParser 1002 and XMLReader 1004 classes are part of the standard org.xml.sax package and read characters from an input stream (file, etc). The actual source of the data is encapsulated by the org.xml.sax.InputSource abstraction. DTDHandler 1010, ErrorHandler 1006, ContentHandler 1008, and DefaultHandler 1012 are interfaces and abstract classes from the org.xml.sax package define the handling methods for the output of the parser. Factory 1014 is an interface that defines the abstraction for a factory that can instantiate implementation objects for the constituent parts of a document, i.e. Document, Element, Attribute, Text, Comment and ProcessingInstruction. DefaultFactory 1016 class provides the default implementation of the Factory abstraction: it instantiates the default implementations of content objects as provided by the com.tbd.dcontent.document package. SAXContentHandler 1018 is an implementation of the various org.xml.sax callback interfaces: it processes callbacks from an SAX parser to assemble Document instances. The actual creation of the Document and its constituent parts is delegated to an instance of Factory. SAXContentBuilder 1020 is a utility class: it encapsulates the process of initializing the SAX parser and building Document instances from various types of InputSource using a SAXContentHandler and a Factory. Also depicted in FIG. 10 are the Delegating Factory 1022; ProcssingInstructionImpl 1024; CommentImpl 1026; TextImpl 1028; ElementImple 1030; AttributeImpl 1032; and DocumentImpl 1034. Now referring to FIG. 11, functions of content templates according to the invention are illustrated. The package com.tbd.dcontent.template 1100 extends the basic XML-SAX-Document framework to provide a template-based adapter framework for instantiation of content using arbitrary Content Adapters. The primitives for dynamic (updating) storage and state management are provided by the package com.tbd.dcontent.adapter are depicted in FIG. 12 and the attendant discussion describes the XML representation of a template. Template 1102 is an abstraction that represents a type of Document that, by virtue of being parameterized, is capable of initializing and caching multiple instances of content data, i.e. different collections of data having identical structure and semantics and all derived from this particular template. By supplying different values for the template parameters, other Components can obtain access to different instances of content. Parameter values are passed to the template as a map of name-value pairs. Meta-data and navigation are provided by the template while data values are stored in an instance of DynamicContent (from the package com.tbd.dcontent.adapter depicted in FIG. 12).

Templates are identified by a name (URI). Like other documents, a Template is comprised of various types of Node, i.e. elements, attributes, etc; however, a Template is comprised of both generic Node implementations and also AdapterNode implementations. A Parameter 1104 represents a named value that modifies one or more substitution points within the template. Substitution 1106 is an abstraction representing the substitution points associated with a Parameter. A Substitution targets a specific Node in a Template. The Node to which a Substitution refers is expected to be SubstitutionNode, either a SubstitutionAttribute or a SubstitutionElement (see below). FullSubstitution 1108 is a Substitution that replaces the entire value of the target Node with the value of a Parameter. TokenSubstitution 1110 is a Substitution that tokenizes the value of the target Node and substitutes the value of a Parameter for one of those tokens, creating a new value for the target.

The AdapterNode 1112 interface is an abstraction that extends the content Node primitive: it has an index. Specialized implementations of AdapterNode will contribute instance-specific content to an instance of DynamicContent 1136. During initialization of the Template (see TemplateImpl 1122 below) each AdapterNode 1112 will be assigned an index for DynamicContent storage. AdapterElement 1114 is mix-in class that provides a convenient AdapterNode implementation of Element for use by content adapter. AdapterAttribute 1116 is a mix-in class that provides a convenient AdapterNode 1112 implementation of Attribute 1142 for use by content adapters.

Figure 11:
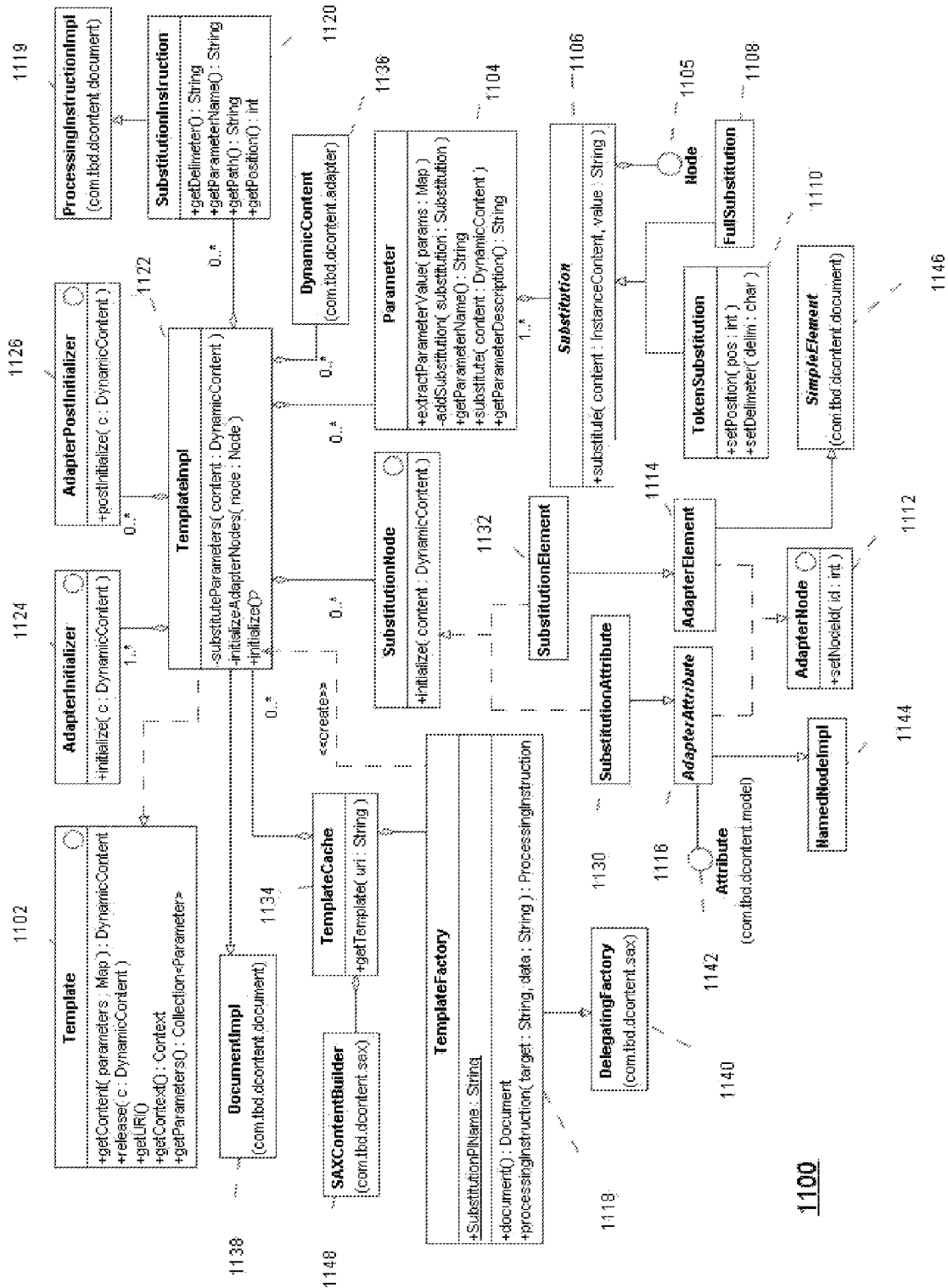
FIG. 11 illustrates Content Templates
Figure 12:
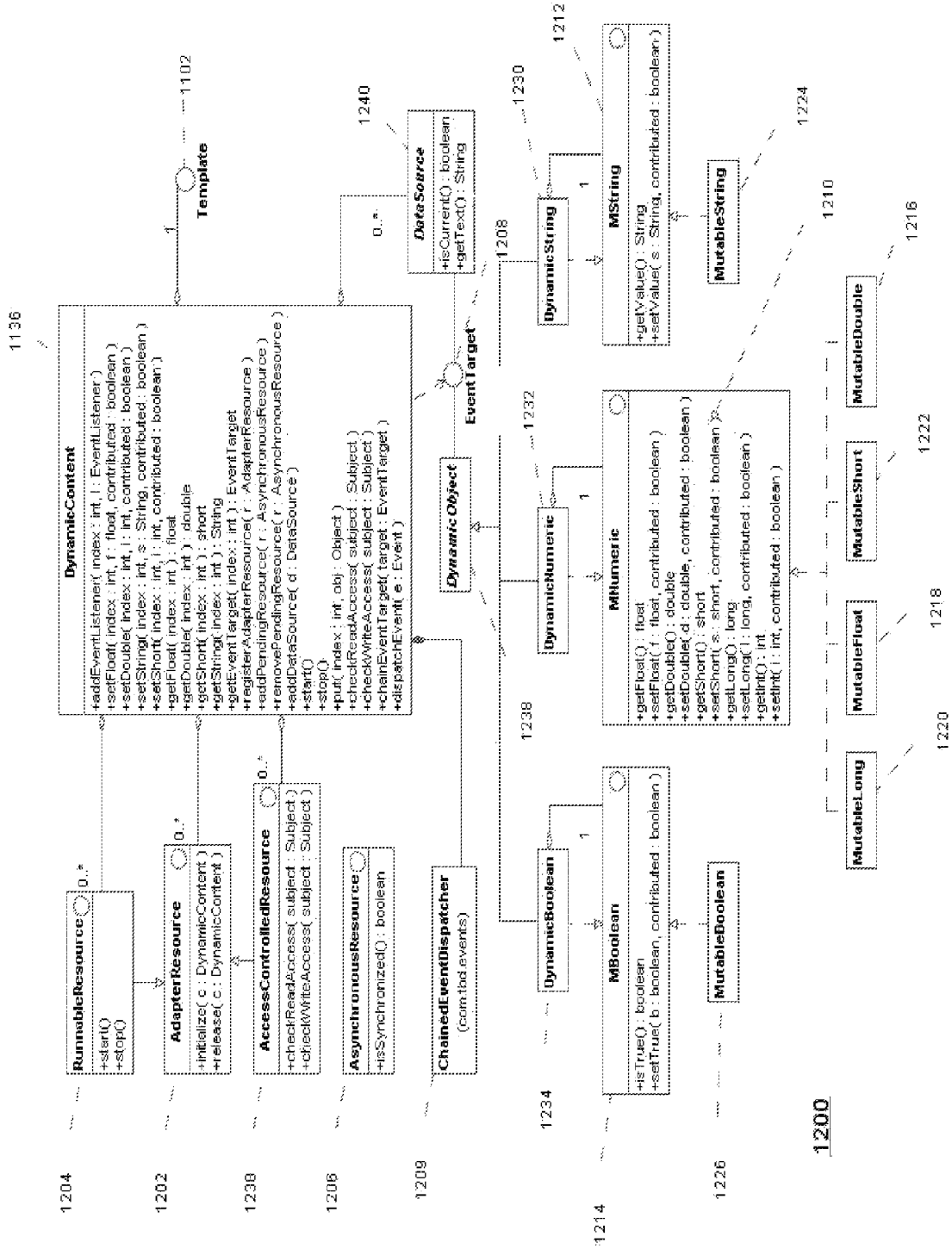
FIG. 12 illustrates Content Instance according to invention.

Further depicted in FIG. 11 are TemplateFactory 1118 and SubstitutionInstruction 1120. TemplateFactory is a specialized version of the DelegatingFactory 1140 from the com.tbd.dcontent.sax package (see FIG. 10, 1022). TemplateFactory creates specialized versions of Document that implement the Template interface (see TemplateImpl below). As an implementation of DelegatingFactory, TemplateFactory delegates by namespace the allocation of elements and attributes to underlying instances of the Factory (FIG. 10, 1014) abstraction. Content Adapters each provide a Factory implementation that allocates specific implementations Element and Attribute, in most cases they are actually specialized versions of AdapterElement and AdapterNode. TemplateFactory also allocates instances of SubstitutionInstruction when it gets requests to allocate instances of ProcessingInstruction for a specific target name ("substitution"). SubstitutionInstruction 1120 is a specialized implementation of ProcessingInstruction interprets the data portion of the processing instruction text as a sequence of attribute (name-value pair) definitions (using the same syntax as that of standard XML attributes). TemplateImpl 1122 is a specialization of DocumentImpl that implements the Template interface. A Template document comprises various types of Node and AdapterNode, contributed from one or more content adapter implementations by way of a specialized Factory associated with the content adapter namespace. During initialization, a TemplateImpl performs the following activities on itself: parameters and substitutions are verified; targets of substitutions are verified and tested and, if not already implementations of AdapterNode are replaced with generic implementations of AdapterNode (either a SubstitutionElement or a SubstitutionAttribute).

Instances of AdapterInitializer 1124 and AdapterPostInitializer 1126 are located and cached for faster retrieval during content allocation. All AdapterNode 1112 implementations are located and assigned a unique index within the Template 1102. On request, a TemplateImpl 1122 creates, initializes and caches instances of DynamicContent 1136. Each request provides a collection of parameter 1104 values. The TemplateImpl 1122 uses the parameter 1104 values to locate and, if necessary, instantiate a particular unit of content (Content Instance), based on the meta-data (Content Specification) in the template (Content Template). The steps in this procedure are as follows: a) Pass the map of values to each template Parameter to extract the parameter value; b) Build a name from the resulting values that will uniquely identify an instance of DynamicContent; c) Check the cache for an instance with that name; d) If not found allocate and initialize a new instance as follows: aa) Allocate a new instance of DynamicContent; bb) For each Parameter, substitute a parameter value into the new content at one or more substitution points; cc) Initialize all instances of AdapterInitializer; dd) Initialize all instances of AdapterPostInitializer.

AdapterInitializer 1124 is an abstraction that provides an entry point, or hook, that allows a Content Adapter to initialize its Components that contribute to a particular Content Instance. An AdapterInitializer will typically install one or more primitive values into an instance of DynamicContent based on the adapter-specific meta-data in the template. Each primitive value is associated with or derived from an AdapterNode and therefore has an index for storage in DynamicContent. An AdapterInitializer may also initiate interaction with external systems required to populate and maintain that data. AdapterPostInitializer 1126 is an abstraction that provides an entry point for those Content Adapters that require a two-phase initialization. SubstitutionNode 1128; SubstitutionAttribute 1130; SubstitutionElement 1132: a SubstitutionNode (either a SubstitutionAttribute or a SubstitutionElement) is a type of AdapterNode that populates an instance of DynamicContent with the value from a Parameter prior to adapter initialization.

TemplateCache 1134 provides access to instances of Template (TemplateImpl) identified by name. A TemplateCache uses a TemplateFactory 1118 to create templates. Once a Template is created, it is cached for subsequent use.

Referring to FIG. 12, the com.tbd.dcontent.adapter 1200 package extends the basic Data Model with new abstractions and implementations to support different types of Content Adapters. This package provides primitive types for storing and updating dynamic content. It also defines the models (abstractions and conventions) for the Component lifecycle, content state management, and content access control.

The following interfaces support the Content Adapter lifecycle: AdapterResource 1202 abstraction represents a Content Adapter Component that needs to be initialized and released. Instances of AdapterResource are allocated and registered with an instance of DynamicContent during the document initialization phase. RunnableResource 1204 abstraction is an extension of AdapterResource that provides lifecycle support for thread-aware adapter resources, i.e. those that need to be started after initialization is complete and stopped before resources are released. AsynchronousResource 1206 abstraction is an extension of AdapterResource used by adapters that retrieve content asynchronously. Adapters that fit this pattern implement the AsynchronousResource interface and register themselves with their containing DynamicContent instance during initialization. The state of a document is affected by the state of any constituent instances of AsynchronousResource. Once these elements are "synchronized," then the document is also synchronized.

Interfaces and classes in the com.tbd.dcontent.adapter 1200 package provide the primitives for dynamic content, providing storage for primitive values and support for bi-directional content modification are as follows:

MNumeric 1210, MString 1212, and MBoolean 1214 interfaces provide the abstractions for mutable versions of primitive types. The setXXX operations of the above classes have a Boolean argument in addition to the value argument. The Boolean argument indicates whether or not the new value is "contributed," meaning that a downstream client application is setting the value. Content Adapters that accept contributed values create sub-classes of the appropriate MutableXXX class and override the set method to intercept the contributed values. These values can then be passed on to upstream systems.

MutableDouble 1216, MutableFloat 1218, MutableLong 1220, MutableShort 1222 are concrete implementations of the MNumeric abstraction are chosen by Content Adapter designers depending on storage/design requirements. MutableString 1224 class provides a concrete implementation of the MString abstraction. MutableBoolean 1226 class provides a concrete implementation of the MBoolean abstraction. DynamicObject 1228 abstraction provides an implementation of the EventTarget construct.

DynamicString 1230, DynamicNumeric 1232, DynamieBoolean 1234 are concrete implementations of the DynamicObject abstraction implement MString, MNumeric and MBoolean (respectively) and provide event propagation wrappers around primitives of type MString, MNumeric and MBoolean. Content Adapters may install primitives of this type in a DynamicContent instance however, these types use more memory than the equivalent Mutable=primitives because they allocate storage for the event propagation mechanism. DynamicContent will automatically wrap a MutableXXX field in the appropriate DynamicObject implementation if an event target for that field is requested. For this reason, a Content Adapter should typically install a MutableXXX primitive and always use the index-driven "setter" methods of DynamicObject to update the value of a field, rather than modifying the field itself. DynamicContent can then handle the event propagation calls if necessary.

DynamicContent 1136 implementation of InstanceContent provides the storage and state management for a particular set of dynamic content primitives (fields) associated with a Template 1102. Content Adapter Components associated with a particular instance of DynamicContent use it to: Register adapter resources for lifecycle management and access control; Register adapter resources for data state management; Publish content values and updates; Receive "contributed" values from downstream Client Applications; Preserve atomicity of data change events; Nest content.

Downstream Components, e.g. Distribution Adapter Components, use an instance of DynamicContent to: Perform read and write (contribution) access checks; Access current values for all fields; Receive atomic notifications regarding data updates; Receive notifications regarding data state events; Contribute values; Access nested content. Both Content Adapters and downstream Components such as Distribution Adapters use the Template associated with an instance of DynamicContent for meta-data and navigation. In the case where Content Linking is used, the inventive architecture adopts a convention within the XPath expression of using '#' character is used to delimit boundaries across linked documents, for example //root-a/link-a#/root-b/link-b#/root-c/value. Note that it is possible to analyze an XPath expression and compute a result expressed as a sequence of indices corresponding to the target nodes for each component of the XPath. This means that, having computed the "index path," values can be quickly access by index rather than repeating a potentially expense XPath analysis.

AccessControlledResource 1238 is an abstraction that represents resources within a document (Content Instance) that require authorizations for read or write access by a Subject. Content Adapters that provided access controlled resources should provide an implementation of this interface, in particular those whose function relates to Content-based Permissioning.

DataSource 1240 is an abstraction representing a remote data source. Its function is to expose the state of the remote data source to Distribution Adapters. As an implementation of EventTarget it generates events corresponding to state changes in the data source. Distribution Adapters can then efficiently convey state changes for all content derived from that source.

DataSourcePool (FIG. 14, 1446) is a simple repository of DataSource implementations. The package com.tbd.dcontent.auth provides the interfaces and class for content access authorization based on numeric codes. Using this paradigm, an administrator assigns numeric codes to content and assigns access rights to users based on those codes. The abstraction for code-based authorization mechanisms, CodeBasedAccessController, extends com.tbd.security.auth.SubjectAccessController interface. CodePermission is an implementation of java.security.Permission, granting or denying access based on numeric values.

The com.tbd.dcontent.list package has a single interface and provides an abstraction for sources of content collections (lists). The DocumentListSource abstraction represents a source of document lists, presented as a java.util.Iterator. A request for a list is qualified with a set of parameters, passed as a java.util.Map. The com.tbd.dcontent.list.db package provides a database implementation of the list source abstraction. DBDocumentListSource is a database implementation of the DocumentListSource abstraction. DBDocumentListIterator is an iterator implementation; it traverses a result set from a database query. DBDocumentListSourceXMLPrototype is specialization of XMLPrototype that configures an instance of DBDocumentListSource.

The package com.tbd.dcontent.util provides the following: TokenBasedParameterGenerator (see FIG. 16, 1616): extracts the values for a collection of name-value pairs (parameters) from a tokenized string; Parameter: a named entity that extracts as its value one or more tokens from a specific position in a sequence of tokens; MappedParameter: a specialized implementation of Parameter that maps the value extracted from a tokenized string to a value from a different namespace of values with the help of a NameMapper; NameMapper: an abstraction providing the means to map a value from one namespace of values into a value from a different namespace. Content Adapters. Together, the Factory associated with a Schema and the implementation-specific elements comprise what is known as a "Content Adapter." Table 1 describes some examples of Content Adapters included in the preferred embodiment.

TABLE 1

| Examples: Content Adapters | |
|---|---|
| Adapter Package | Description |
| com.tbd.nca.mddl.rmds | Defines data in terms of the industry standard Market Data Definition Language (MDDL); maps/converts data from the Reuters Market Data System to conform to this standard. |
| com.tbd.nca.mfml.rfa | Defines data in terms of the Reuters Marketfeed data model; maps/converts data from the Reuters Market Data System to conform to this standard. The Content Adapter uses the Reuters Foundation API (RFA) |
| com.tbd.nca.jdbc | Extracts data from a JDBC-compliant database. Values contributed to the Content Instance by clients using various Distribution Adapters will update the database. Elements supported by this adapter can also provide access to vectors of data. |
| com.tbd.nca.analytics | Performs value-added calculations, taking as input data from other parts of the Content Instance. Analytics range from simple numeric and boolean operations to domain-specific calculations (such as VWAP calculations or option valuations); analytics may incorporate vectors of data ex., to calculate a moving average. |
| com.tbd.nca.rv | Intercepts TIBCO Rendezvous messages on a particular subject and represents the content of those messages as values in a Content Instance. Values contributed to the document will be published to the underlying Rendezvous subject. |
| com.tbd.nca.jms | Listens to JMS topic messages and represents the content of those messages as values in a Content Instance; values contributed will be published to the underlying JMS topic. |
| com.tbd.nca.audit | Represents internal audit trail events as content. |
| com.tbd.nca.log | Represents standard logging events as content. |
| com.tbd.nca.monitor | Exposes object properties and methods as content; values contributed to the Content Instance will modify the underlying object. |

Figure 13:
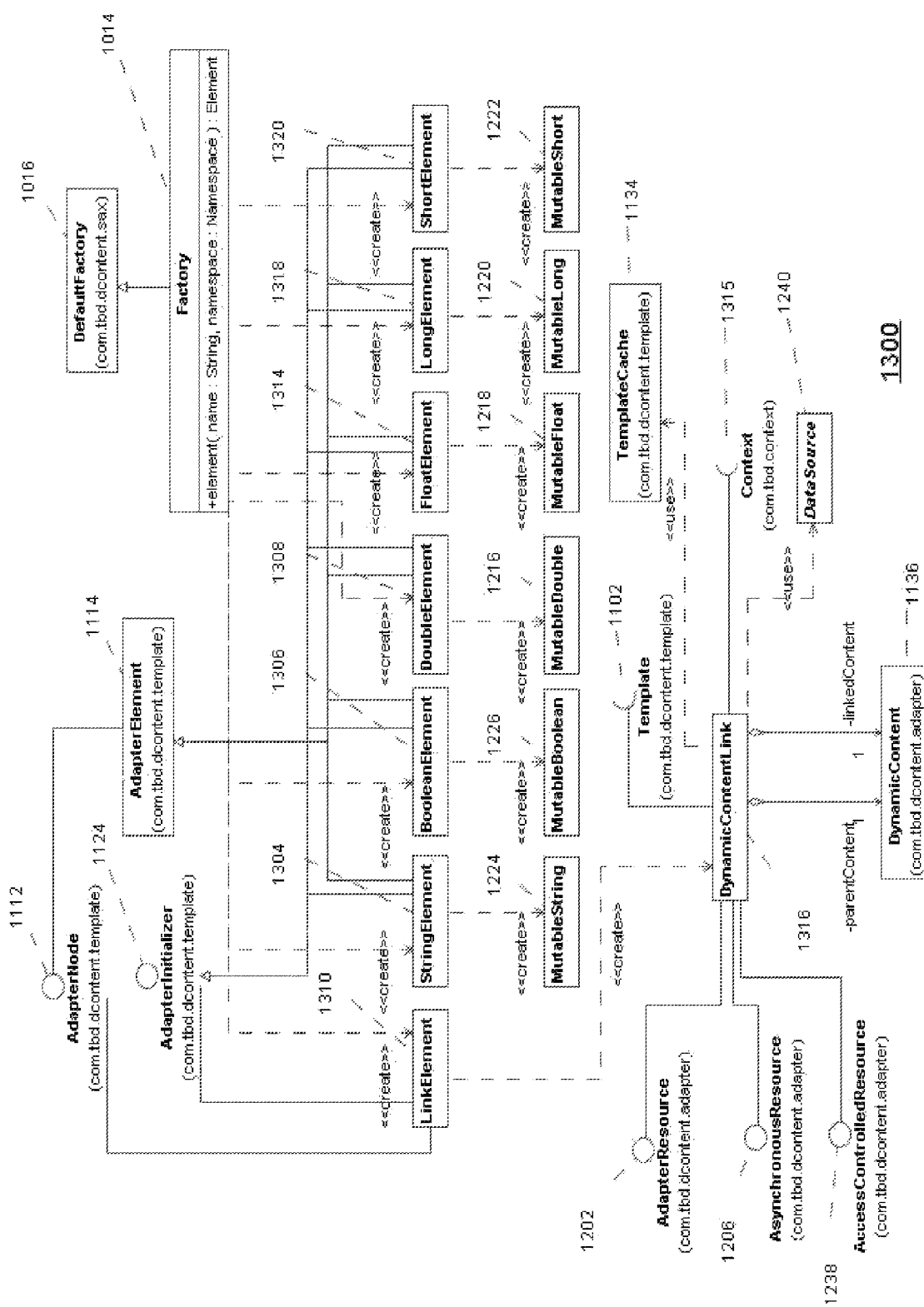
FIG. 13 illustrates primitives datatypes, including linking mechanism for linking one unit of content with another.

The following discussion, in conjunction with FIG. 13, describes some exemplary Content Adapters in more detail. The package com.tbd.nca.basic 1300 contains a Content Adapter that provides some primitive dynamic content fields as well as a mechanism for linking one Content Instance with another (Content Linking).

As represented in FIG. 13, Factory 1014, an implementation of DefaultFactory 1016 overrides the default element allocation behavior to create the specialized elements from this adapter. StringElement 1304, BooleanElement 1306, DoubleElement 1308 are implementations of AdapterElement 1114 and implementations of AdapterInitializer 1124, and allocate a primitive field of the relevant type. These Content Adapter elements implement non-persistent storage for data contributed from downstream Client Applications. For example, a local—or contributed—price, described in the Content Specification by a FloatElement 1314 and represented as a floating point value stored in a MutableFloat 1218 can be integrated into a Content Instance that contains market data. Downstream Client Applications using various types of Distribution Adapters can then contribute a price for dissemination to any other subscribers of that dynamic content.

LinkElement 1310 is an implementation of Element 908 also implements the AdapterNode 1112 and AdapterInitializer 1124 interfaces. LinkElement extracts metadata from the content definition and uses that to instantiate and configure and instance of DynamicContentLink 1316. The following fragment shows an example of the metadata:

```
<b:link name='equity'>
  <b:template context='com.tbd.content.mddl' uri='common_equity'>
```

-continued

```
<b:param name='Ticker' value='$ticker'/>
<b:param name='Exchange' value='$exchange'/>
</b:template>
</b:link>
```

The DATAVIEW following provides an example of Content Linking from one Content Specification as well as a description of the full Schema definition for this adapter. DynamicContentLink 1316, an implementation of AdapterResource 1202 manages a reference to a linked unit of DynamicContent 1136 that will be linked to or "nested" inside the containing instance of DynamicContent. DynamicContentLink registers the instances of DataSource 1240 from the linked content with the containing content and otherwise couples the state of the containing content to that of the linked content. By implemented AsynchronousResource interface, DynamicContentLink can propagate initialization state from the linked content to the containing content. Lastly, DynamicContentLink also implements the AccessControlledResource interface but will delegate authorization checking to any instances of AccessControlledResource that authorize the linked content.

In the preferred embodiment, the com.tbd.nca.mfml package provides an abstraction for implementations of Content Adapters that interpret MFML (Marketfeed Markup Language). The DATAVIEW section provides the Schema that governs this markup. Marketfeed is a protocol and data-encoding format used in the Reuters Market Data System (RMDS). MNML is used to represent Marketfeed content in the preferred embodiment. The Factory extension of DefaultFactory defines a set of constants that represent the MFML URI and the various element names used by the MFML schema.

In the preferred embodiment, the package com.tbd.nca.mfml.rfa provides an MFML Content Adapter implemented with the Reuters Foundation API (RFA). The Factory extension of the base MFML Factory class (see FIG. 13) allocates and initializes instances of RecordElement as well as the various MFML field element types (PriceElement, DateElement, etc) as requested during the document build process (see TemplateImpl 1122, FIG. 11). Factory requires access to RFA sessions and other resources which must be located and initialized by the Component Framework. The element RecordElement implements the AdapterInitializer abstraction and is responsible for locating and initializing the MFML field elements in a Content Template. As an AdapterInitializer it also initializes instances of DynamicContent when requested by the containing Template.

FieldElement, an intermediate abstraction, extends the AdapterElement abstraction and interprets meta-data common to all descendant types; it uses an attribute called "name" to identify an underlying RFA marketfeed field. As extensions of AdapterElement, itself an extension of AdapterNode, all descendants of FieldElement will be allocated an index and, during Content Instance initialization, will insert a data field into each instance of DynamicContent created by the containing Template.

During the content initialization phase of DynamicContent initialization, the AlphanumericElement and PriceElement implementations of FieldElement each allocate a corresponding implementation of RFAField (an abstraction for individual types of fields), registering it with both the an instance of RFARecordResource and an instance of DynamicContent. During initialization, the RFARecordResource, a class managing interaction with RFA, sets up the RFA subscription to required content and registers the appropriate DataSource instances with the DynamicContent instance. The RFARecordResource handles RFA events and parses data received from RFA, generating document-level events and propagating data events to the individual fields; when released, it, in turn, releases any RFA resources used. AlphanumericField and PriceField, are classes provided storage (within an instance of DynamicContent) for individual data fields. They also perform any required data transformation and manage the propagation of data change events at the field level.

In the preferred embodiment, the package com.tbd.nca.jdbc provides a Content Adapter that operates with a JDBC compliant data source. The adapter supports bidirectional interaction through JDBC, i.e. JDBC content can be integrated with other content types and downstream client applications can modify that content and have the results persisted into the JDBC data source by means of a SQL UPDATE operation. (A Schema that governs this markup appears in the DataView section hereinbelow).

Factory, an implementation of DefaultFactory, overrides the default element allocation behavior to create the specialized elements from this adapter. A Factory has a reference to a pool of JDBC connections. DBTableElement, an implementation of AdapterInitializer, creates and initializes a DBTableResource, providing the information regarding which JDBC connection to use and the table to query as well as locating and initializing the various instances of DBColumnElement. A DBTableElement and its various children of type DBColumnElement result in a query that extracts the values from some number of columns in a single row of a table. DBTableResource, an implementation of AdapterResource, builds the SQL SELECT statement and populates underlying DBField instances with values. It monitors events from its containing instance of DynamicContent, checks for modified fields and builds and executes UPDATE statements to update the JDBC data source as required. DBColumnElement, an implementation of AdapterElement, is an intermediate abstraction that represents other adapter elements. StringElement, LongElement, and DoubleElement, implementations of DBColumnElement, populate an instance of DynamicContent with the relevant field DBField implementation. DBField is an abstraction representing the various types of values corresponding to columns for a particular row in a table. A DBTableResource relies on this abstract interface to process query results and to build UPDATE queries for fields as they are modified by downstream client applications. StringField, LongField, and DoubleField implement the DBField abstraction and extend the base primitive types MutableXXX. Each overrides the various setXXX operations and, when modified by a downstream "contributor," registers itself as "dirty" with its containing instance of DBTableResource.

Distribution Adapters. A Distribution Adapter according to the preferred embodiment is described herein. An appreciation of the functions of the exemplary Map Message Adapter described below, is aided by appreciation of the JMS plug-in architecture as described, and in particular the model and the content plug-in described in FIG. 13. The JMS map message adapter makes content available to topic subscribers and publishers via a JMS map message protocol. Map messages represent content as name/value pairs. The JMS map message adapter uses a configured list of fields to convert the hierarchical content representation into the flat map message structure. This conversion is configurable on a per topic basis and for each fields specifies the type of the JMS field object and the XPath expression that identifies the target element in the document. The adapter supports the linked document construct (see FIG. 13). The JMS map message adapter conveys content state to Client Application using a specific set of JMS message property fields. The adapter can attach these properties to data message or may send them separately (without data) depending on the situation. Client Applications that use market data need to understand how to interpret these properties. When a content destination gets a new subscription request, it creates a subscriber proxy asks the adapter to initialize the new subscriber.

The JMS map message adapter also accepts published map messages and applies published values to the underlying Content Instance. Before delivering an image to a new subscriber, the JMS map message adapter checks that the Subject for the subscriber is granted read access by each access control instance associated with the requested Content Instance.

The semantics of streaming market data delivery typically require that a subscribing client application receives a complete image of the requested content followed by a sequence of updates. Updates modify and deliver new values for a subset of the data in the image. Subscribing client applications also expect to be notified of changes in the condition of the data, e.g. if an underlying communication channel is interrupted, then the data from that channel is potentially out-of-date and is considered "stale."

The RMD Distribution Adapter. In the preferred embodiment, the RMDS Distribution Adapter com.tbd.da.rmds enables interaction between content defined using the inventive Content Integration Framework and RMDS-based applications. The Reuters Market Data System (RMDS) is a market data distribution platform; it provides APIs that allow applications to publish and subscribe data. Using the RMDS Distribution Adapter, RMDS applications see a new "source" on RMDS; they can request items from this source (in which case they will receive images and updates); they can also contribute data to this source using the RMDS "insert" mechanism. RMDS applications request data using an item name, a character sequence of finite length. The RMDS Distribution Adapter parses this character sequence to extract the information necessary to determine either a document instance name or a document template name and template parameters. Because item names are typically short, there are limitations to the scope of this mechanism. Some examples: a) a source that uses a singe document template for all content can use the item name as a parameter, typically this parameter would identify the underlying data; b) a source with multiple document templates can use the first letter of the item name to lookup a template.

The RMDS Distribution Adapter is a so-called "interactive source server," meaning that it doesn't publish any data until that data is requested by an RMDS application via the RMDS infrastructure. The RMDS Distribution Adapter encodes images and updates in Marketfeed, a Reuters' proprietary format that represents data as name/value pairs known as fields. Fields have an identifier, a type, and a value. A dictionary defines the set of valid identifiers for a given source. Field types are one of a small predefined set, e.g. PRICE, DATE, etc. An administrator or developer configures the RMDS Distribution Adapter to map elements from a particular document or document template into a set of fields.

RMDS relies on the Data Access Control System (DACS) for authorization of subscription and contribution requests. The RMDS Distribution Adapter receives DACS locks with any data retrieved from RMDS. It will republish those locks when it publishes data to RMDS; a specialized Content Adapter enables the creation of DACS locks. The RMDS Distribution Adapter extracts any locks published in this manner and passes them through to RMDS so that RMDS can enforce any access control restrictions via the DACS infrastructure.

The Hyper Text Transfer Protocol (HTTP) is the standard protocol by which applications access information on the Internet. In the preferred embodiment, the HTTP distribution allows client applications to access content encode from documents containing integrated and value-added content. Client applications use the HTTP GET operation to access content. Client applications can also contribute content to documents using the HTTP POST operation. The preferred embodiment uses the Jetty HTTP server. Jetty implements the standard J2EE servlet APIs and handles all the network operations along with encoding/decoding of HTTP headers. Jetty also provides implementations of HTTP sessions and basic HTTP security mechanisms for authentication (using SSL).

In the preferred embodiment, HTTP Distribution Adapter is responsible for mapping URLs to document instances or templates. It also handles the encoding of content into the response, dealing with errors and exception conditions, such as authorization errors when accessing content. Jetty provides the means to map GET operations on a set of URLs to a specific handler. The preferred embodiment provides a handler for document instances and for document templates. The document instance handler looks for a document named in the URL and retrieves that document from the document loader then encodes it into XML. The document template handler extracts the template name and template parameters from the URL and uses that information to create and encode the response. Another Distribution Adapter in the preferred embodiment, the JDBC Distribution Adapter, com.tbd.da.jdbc, provides a JDBC driver implementation that emulates a relational database storage model. It supports data retrieval (static results) via the SQL SELECT expression and updates (contribution) via the SQL UPDATE expression.

The JMS Server according to the preferred embodiment. In the current embodiment, the package javax.jms contains the standard JMS interface. As the standard JMS interface is well known, it is not set forth here. Inventive aspects of the preferred embodiment are set forth below.

The package com.tbd.jms.client provides the preferred implementation of the standard JMS programming interface supporting both Topic and Queue destination types. The discussion below focuses on the inventive features of the preferred embodiment, and relies for background on the commonly understood properties of JMS. The invention is further discussed in patent applications by the same inventors cited in the introduction.

In the preferred embodiment, ConnectionImpl, an abstract class, is the base implementation for the JMS Connection abstraction. A Connection is a logical connection concept defined by the JMS model. The preferred embodiment of the invention extends implementation of this concept: first, to separate the logical connection from the physical implementation and second, to allow a single logical connection to comprise multiple physical connections to one or more remote servers.

Figure 18:
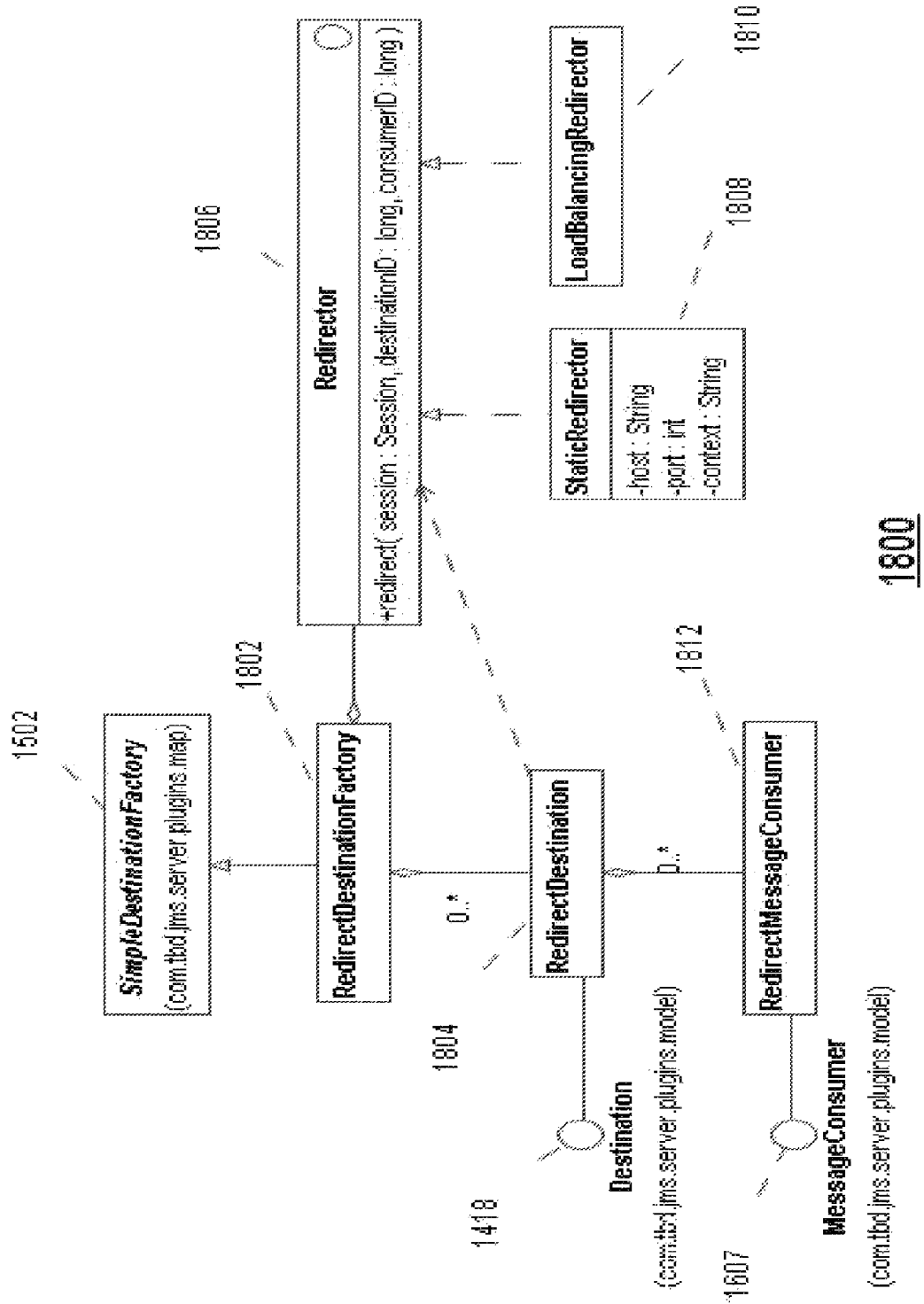
Figure 19:
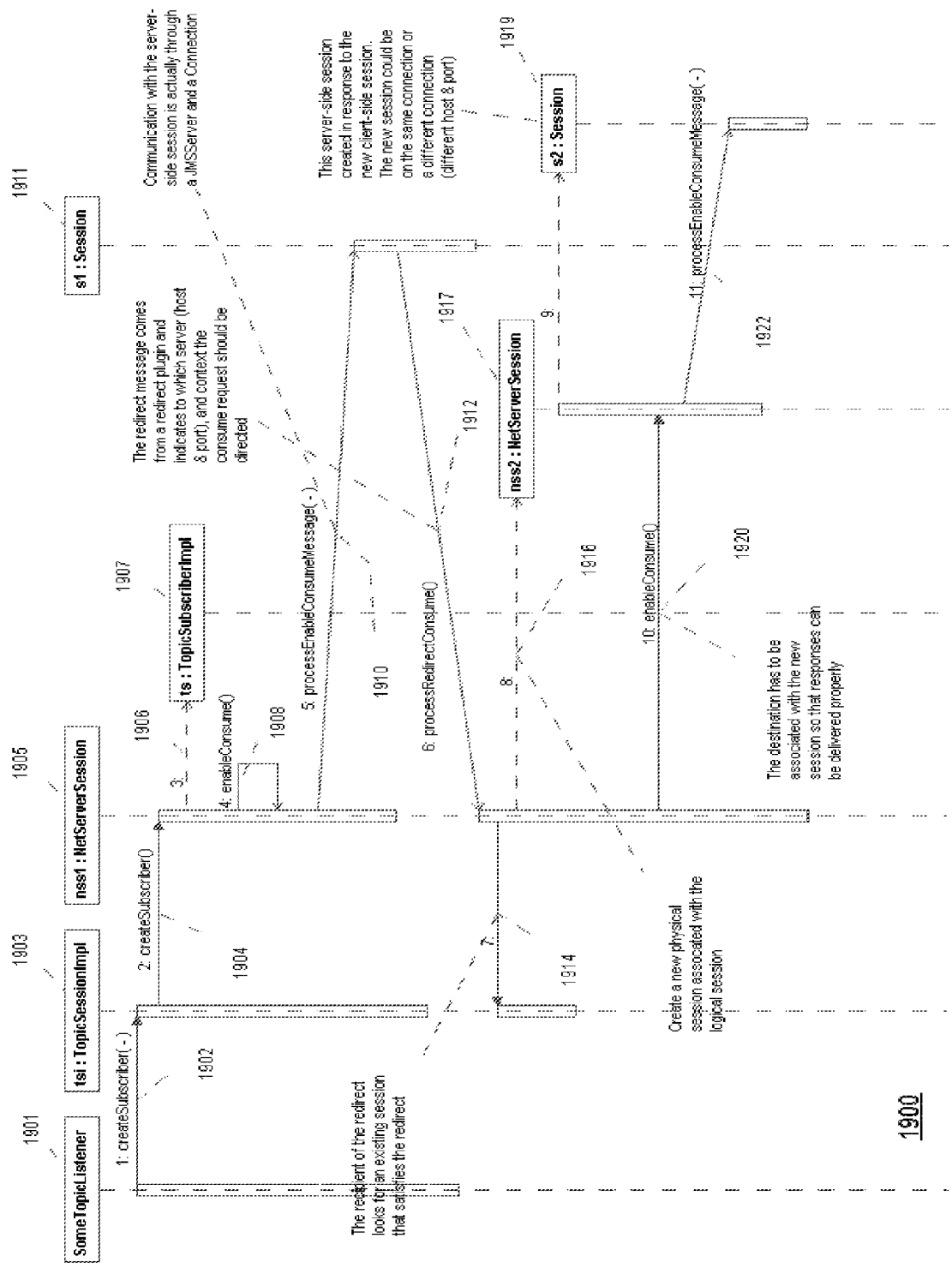
FIG. 19 illustrates subscription load balancing client-side architecture.
Figure 20:
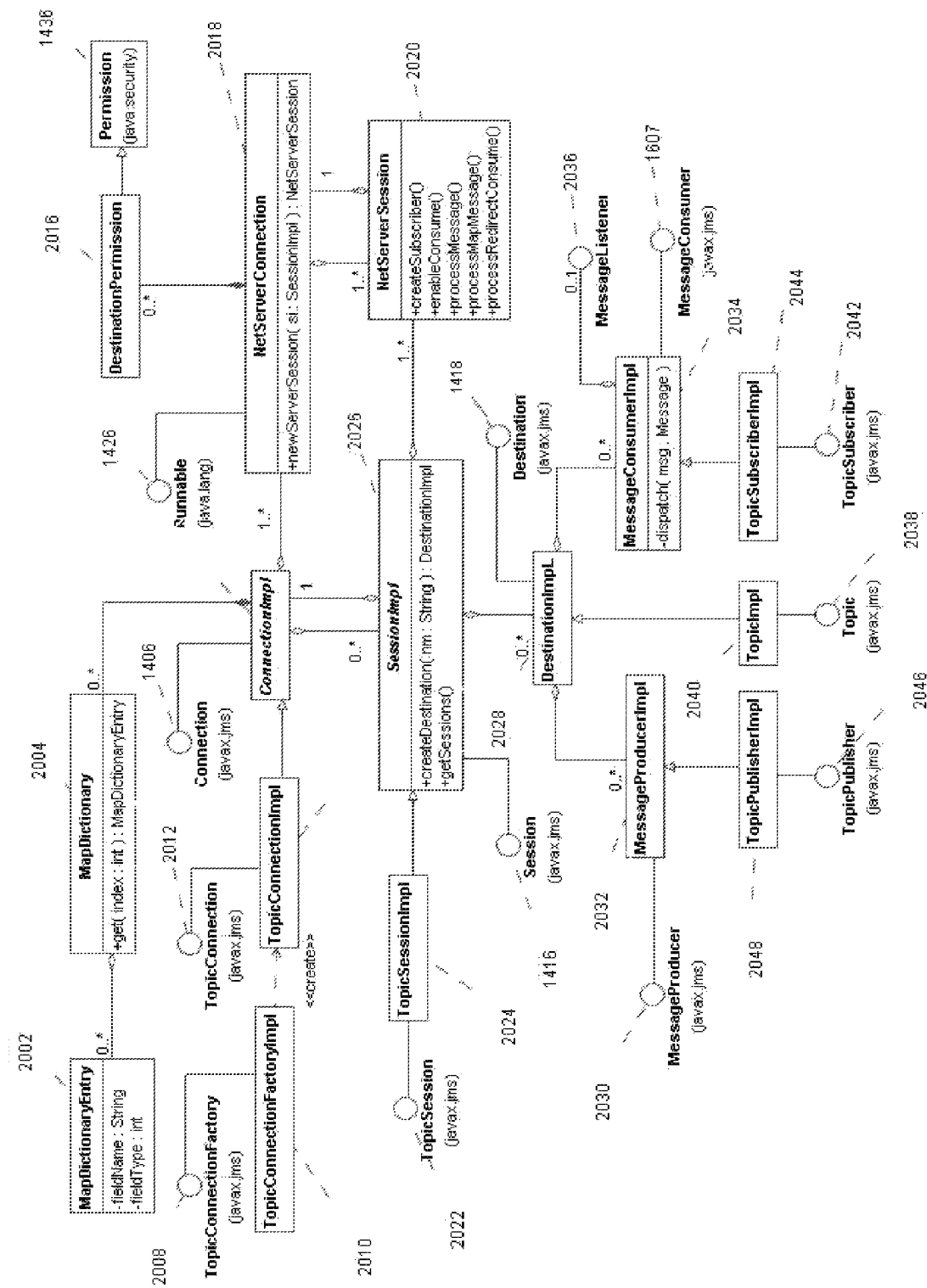
FIG. 20 depicts client-side architecture abstractions that support routing and load balancing according to the invention.

The separation of physical connections (and sessions) from the logical representation supports various types of load balancing in which different destinations are assigned to different servers (see FIG. 18).

When creating a Connection, a client application may specify the host and port specifically or may rely on the connection factory in deciding where to connect. The implementation according to the preferred embodiment provides an extension that allows the client application (or factory) to provide a list of possible host/port server end-points (Inet- SocketAddress). ConnectionImpl will try each of these in turn, and attempt to establish an initial physical connection (an instance of NetServerConnection). A ConnectionImpl also caches dictionaries used for optimized MapMessage encoding and decoding. This optimization is support by some server-side plug-in implementations. The cache of dictionaries is built dynamically as entries are sent by the server on an as-needed basis.

The SessionImpl abstract class is the base implementation for the JMS Session abstraction. A SessionImpl corresponds to the logical session defined by the JMS model. The TBD implementation extends this concept to separate the logical session from the physical implementation and allows a single logical session to comprise multiple physical sessions attached to one or more remote servers. The physical sessions are each represented by an instance of MetServerSession. An instance of SessionImpl creates and caches Destination instances.

NetServerConnection: this class represents a physical connection to a remote server. It implements the standard Sava Runnable interface and provides the execution loop that processes inbound and outbound messages for that particular physical connection. A NetServerConnection establishes the physical socket connection and authentication with a server synchronously, i.e. during initialization it performs blocking I/O and waits for a response from the server. The positive acknowledgement from the server will include a list of destination-level permissions for the authenticated user.

A NetServerConnection supports one or more sessions with the server, each of which is represented by an instance of NetServerSession. Connection initialization is synchronous—the connection passes credentials to the server and waits for a response. The connection also caches the instances of destination read/write permissions for the authenticated subject by creating a list of instances DestinationPermission. The permission data is sent by the server as part of a successful initialization sequence. A ConnectionImpl also caches the meta-data for destinations that use a compressed MapMessage protocol.

NetServerSession: A NetServerSession represents a physical session established with a remote server and is the main focal point of all session-level messaging. As a client application creates consumers and publishers, NetServerSession enables the flow of messages between client and server and routes messages to and from the server and any consumers and publishers in the client application.

DestinationImpl is an abstract class that is the base implementations of the Destination abstraction. An instance of DestinationImpl caches instances of MessageConsumer and MessageProducer and, for client applications that consume messages by polling, implements a message queue.

MessageProducerImpl class interacts with a SessionImpl on behalf of a client application end-point that produces messages. MessageConsumerImpl class interacts with a SessionImpl on behalf of a client application end-point that consumes messages. TopicConnectionFactoryImpl, an implementation of TopicConnectionFactory, creates instances of TopicConnectionImpl. TopicConnectionImpl, a specialization of ConnectionImpl provides a connection for topic-based communication. TopicSessionImpl, an implementation of SessionImpl, provides the functionality to create concrete instances of topic-specific abstractions, i.e., Topic, TopicSubscriber, and TopicPublisher. TopicImpl, an extension of DestinationImpl, provides a concrete implementation of the Topic abstraction. TopicSubscriberImpl, an extension of MessageConsumerImpl, provides a concrete implementation of the TopicSubscriber abstraction. TopicPublisherImpl, an extension of MessageProducerImpl, provides a concrete implementation of the TopicPublisher abstraction.

Figure 14:
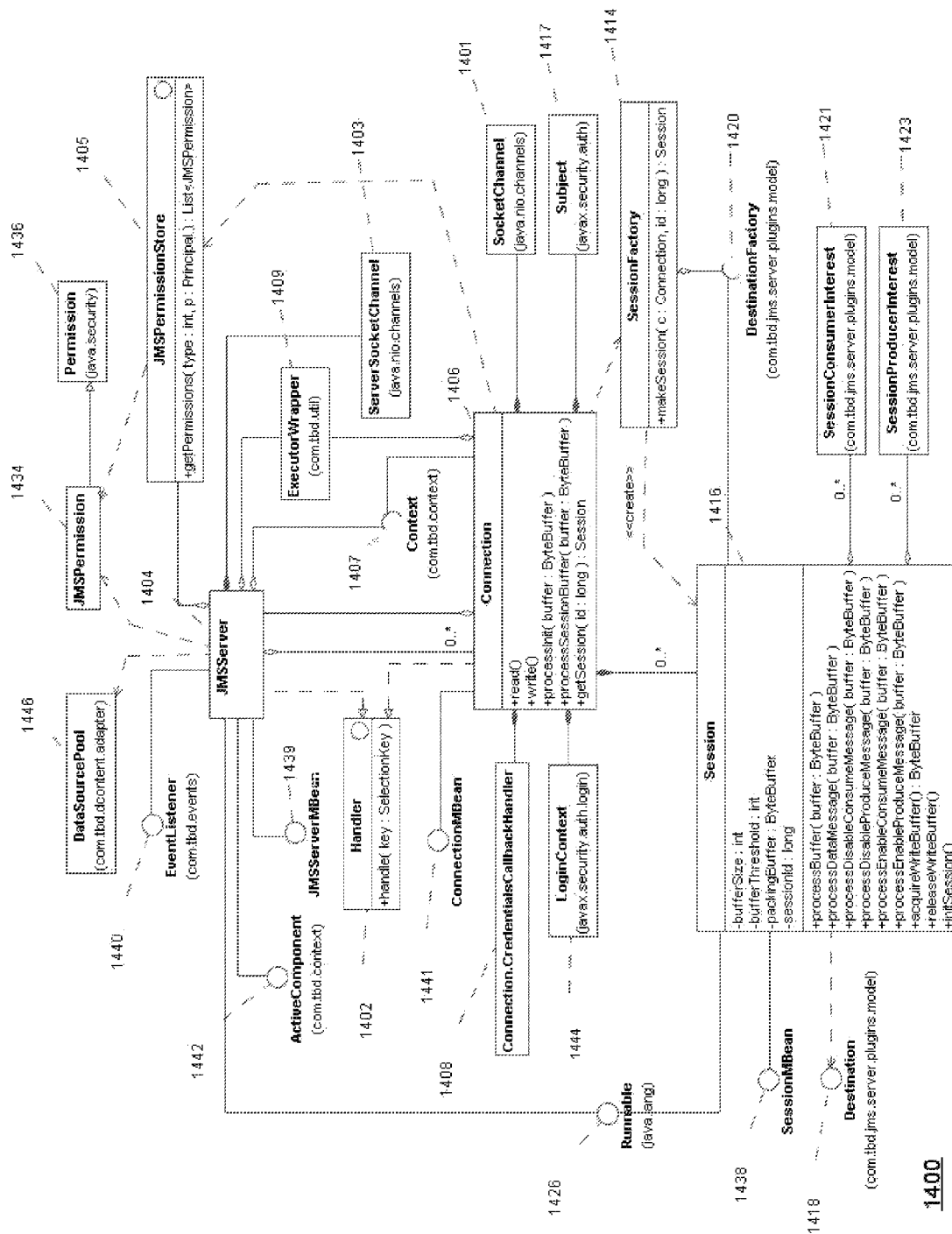
FIG. 14 illustrates the JMS server architecture.

FIG. 14 illustrates a JMS server architecture (com.tbd.jms.server) according to the preferred embodiment. The Handler 1402 interface provides the abstraction for I/O handlers. The JMSServer 1404 class creates the TCP/IP socket [ServerSocketChannel] 1403 that receives inbound connection requests from clients. It also handles the initial notifications for pending I/O operations. In response to connection requests, it allocates instances of Connection 1406 to handle the new channel [SocketChannel 1401]. Read/write indications for the new channel are handed off to the appropriate Connection instance for processing.

The EventListener 1440 interface represents a Component interested in receiving events from some event source. DataSourcePool 1446 is a simple repository of DataSource implementations (an abstraction representing a remote data source whose function is to expose the state of the remote data source to Distribution Adapters) (see 1240, FIG. 12). The ActiveComponent 1442 interface represents Components that require explicit initialization and release via start( ) and stop( ) methods.

The Connection 1406 class represents a remote JMS client API connection. It authenticates client credentials and allocates instances of Session corresponding to session created in the client API. A Connection instance performs the read/write operations for all its Session 1416 instances.

A Connection authenticates a client using a Connection.CredentialsCallbackHandler 1408. Authenticated clients receive a list of destination permissions obtained from a JMSPermissionStore 1405. Clients can then perform destination-level authorization [Permission1436] without contacting the server.

A Connection uses a SessionFactory 1414 to allocate sessions and retrieves that SessionFactory from a particular Context 1407. If the client application does not specify a Context, a default is applied. A Session 1416 allocates all resources from that Context effectively providing an Application Context that can isolate the resources for one session from other sessions.

A Connection 1406 uses the login framework defined by the Java Authentication and Authorization Service (JAAS). When a client connection is created, the server creates a login Context whose implementation is determined by configuration. The JAAS mechanism uses a callback construct Connection.CredentialsCallbackHandler 1408 to obtain the credentials required for a particular login domain. In this case, the server satisfies the call-back requests using initialization data passed by the Client Application. The login Context [LoginContext 1444] will perform validation of credentials. Possible implementations of the login Context include trivial (no credentials required), database-stored name/password, operating system name/password, and distributed mechanisms, such as Kerberos. After successful authentication, the JAAS framework provides an authentication Context, or Subject 1417 that is retained by the Connection.

Connection.ReadWork 1410, Connection.WriteWork 1412 are implementations of Runnable 1426 provide scalability by allowing a Connection to delegate I/O activities to an Executor: (ExecutorWrapper 1409 class is a wrapper around an instance of java.util.concurrent.ThreadPoolExecutor. The wrapper is a configurable Component exposed for management with JMX. By virtue of being a Component it allows an executor to be shared among multiple Components.)

The SessionFactory 1414 class encapsulates the configuration for a session. All sessions created by a particular SessionFactory have an identical configuration. The Session 1416 class manages requests from the client API for consumption and production of messages. Based on demand from the JMS client application to consumer and/or produce messages it locates instances of Destination 1418 by name using a DestinationFactory 1420, an abstraction. It then obtains instances of MessageConsumer and MessageProducer as appropriate. A Session uses the JAAS "run-as" construct initiate consumer and producer requests from clients using the Subject associated with the session's Connection. This identity is then available to the plug-in implementations for authorization purposes. The Session provides an audit trail that logs identity, host name, time, and activity type for subscription start/stop and publication start/stop activities.

Session.EnableConsumeWork 1422, and Session.EnableProduceWork 1424, implementations of Runnable, provide scalability by allowing the Session to assign these activities to an Executor. Session.EnableConsumeAction 1428, and Session.EnableProduceAction 1430, implementations of the standard Java PrivilegedAction 1432 interface, encapsulate consumer and produce requests in the identity of the requesting clients and allow a plug-in to perform authorization of client activity. SessionConsumerInterest 1421; SessionProducerInterest 1423 are discussed with FIG. 16.

The JMSPermissionStore 1405 abstraction represents a repository of JMSPermission that provides the list of permissions for a specific identity. JMSPermission 1434 represents consume and produce privileges for a single destination name or a pattern of destination names. The package com.tbd-.jms.server.pug-ins.model defines the abstractions and base implementation classes that comprise the modular implementation of the JMS server. Depictions can be seen by reference to FIG. 14 and FIG. 16 as noted. The Destination 1418 interface represents the abstraction for a JMS messaging destination. Destinations can be either topics or queues. In this architecture there can be many different implementations of the Destination abstraction. Each JMS plug-in provides a different type of implementation. The DestinationFactory 1420 interface represents the abstraction for creating destinations. A Session uses this interface to allocate instances of Destination. The DestinationCache 1601 interface represents a collection of Destination instances. Destinations use this interface to release themselves from cache when there are no longer any producers or consumers for that particular destination. The MessageConsumer 1607 abstraction provides the means to route message from a Destination to a particular remote message consumer (via a Session and Connection).

SessionInterest, an abstraction, represents the interest of a Session in a particular Destination for either consumption or production of messages. A SessionInterest retains the unique identifier associated with a particular Destination on a given client Session.

SessionConsumerInterest 1421 is an implementation of SessionInterest represents the interest of a Session in consuming messages from a particular Destination. For each JMS client API consumer (either a TopicSubscriber or a QueueReceiver) the SessionInterest uses the Destination to allocate a corresponding MessageConsumer instance. SessionProducerInterest 1423 is an implementation of SessionInterest represents the interest of a Session in producing messages for distribution to consumers.

Plug-able Logic Framework. The preferred embodiment provides a plug-able framework. Certain plug-ins of the preferred embodiment are discussed herein by way of example and description of inventive aspects. The server includes a plug-in that provides standard JMS functionality for both Topics and Queues, providing transactional capabilities and supporting persistent messages. The discussion assumes familiarity with commonly understood standard JMS functionality.

Figure 15:
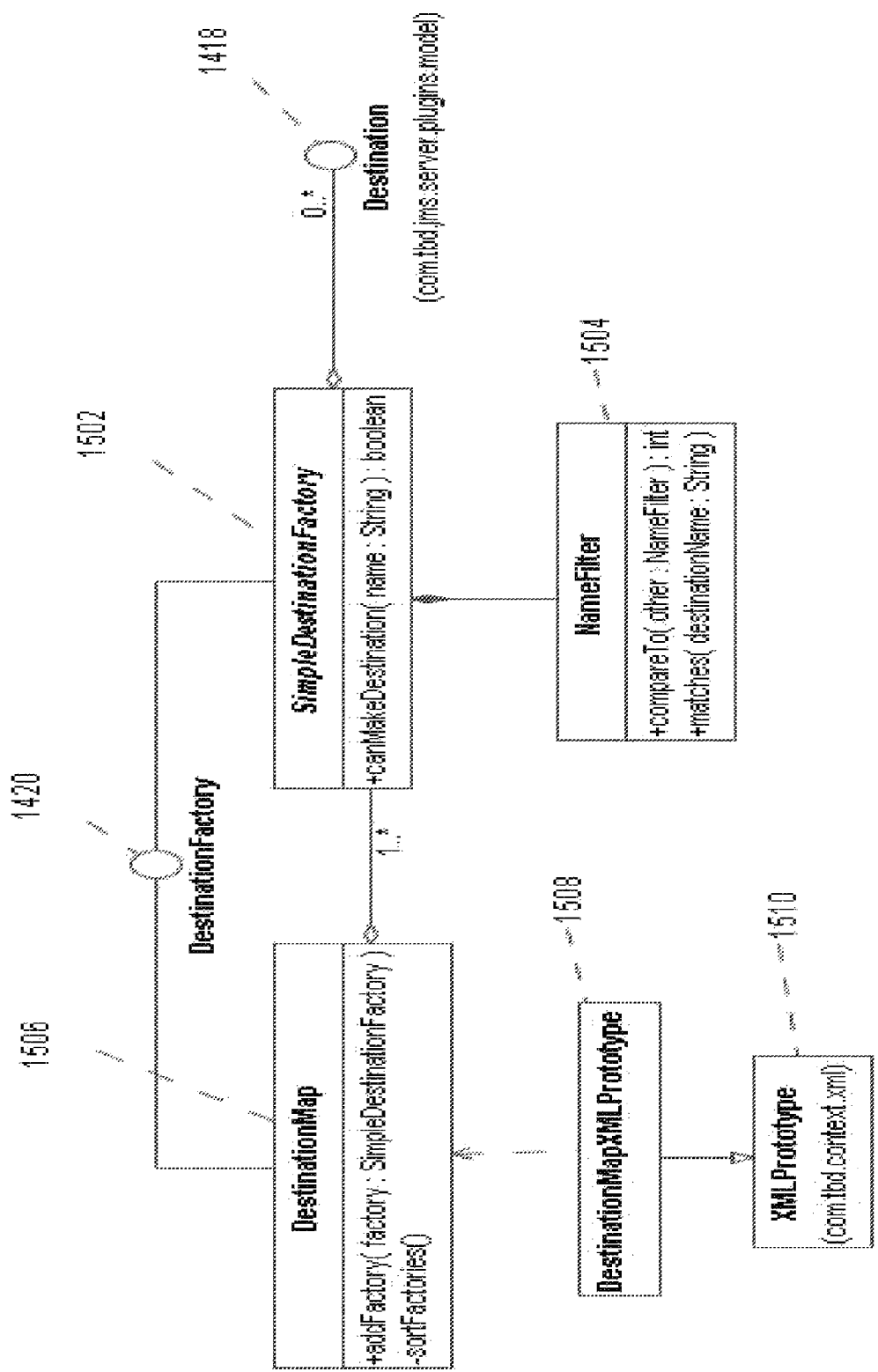

FIG. 15 illustrates a Destination Map or Mapping Plug-in according to the preferred embodiment. The class SimpleDestinationFactory 1502 is a basic caching implementation of the DestinationFactory 1420 abstraction. The different plug-in implementations sub-class this abstract to create the different types of Destination 1418. The NameFilter 1504 utility provides the means to sort a list of SimpleDestinationFactory instances and determine whether or not a particular factory can supply the required destination. NameFilter supports both deep and shallow wildcards. The DestinationMap 1506 implementation delegates the construction of Destination 1418 instances to one of a collection of underlying DestinationFactory 1420 instances. A factory is selected on the basis of the requested Destination name. In effect, the destination namespace is divided up among different factories (plug-ins). A plug-in may support a specific name or, by means of a wildcard expression, a range of names. For example, a plug-in may be assigned to "equity.-," which means all destinations whose names start with "equity." The DestinationMapXMLPrototype 1508 is a custom prototype that configures a DestinationMap with a list of SimpleDestinationFactory instances.

Figure 16:
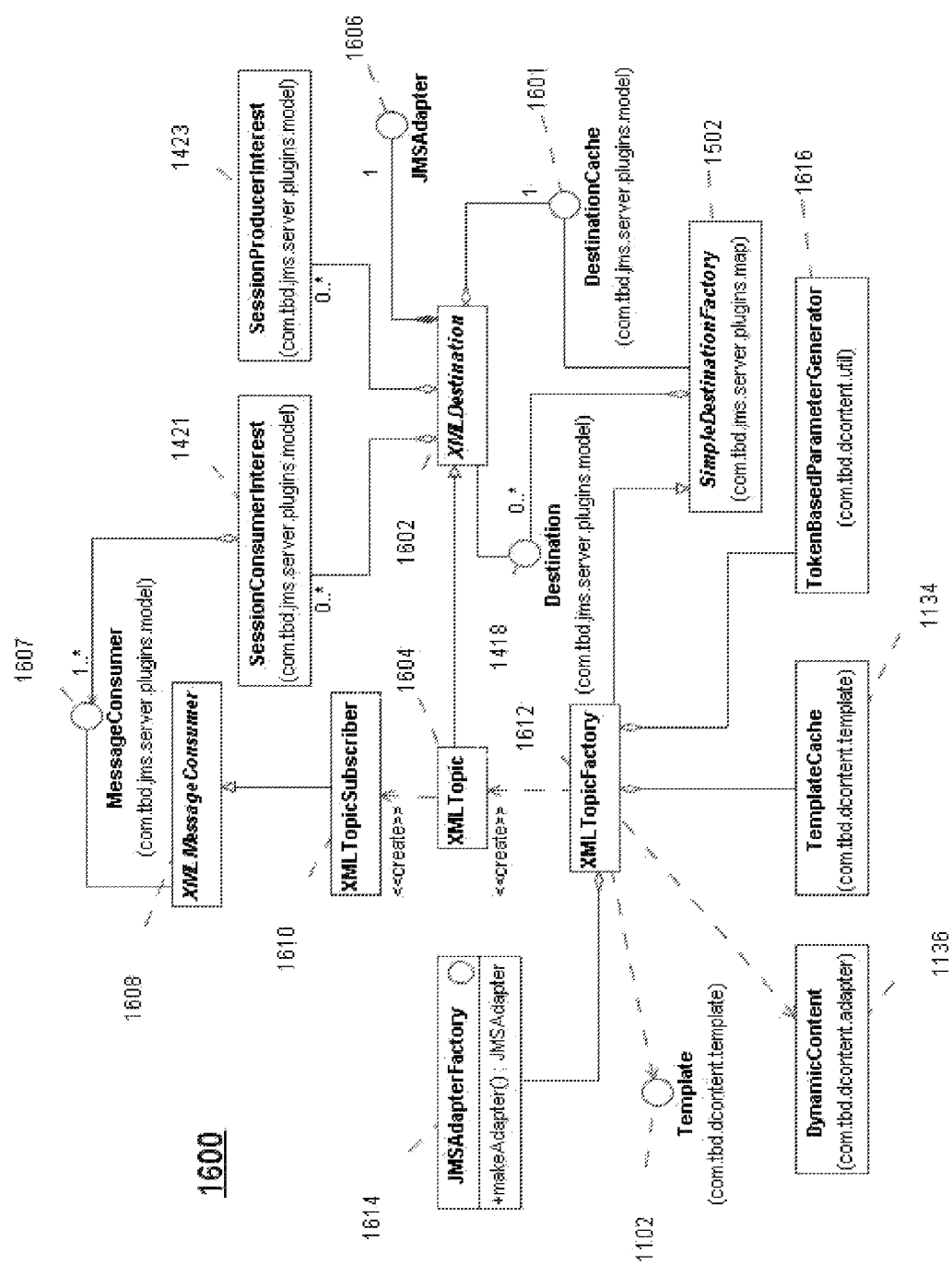

FIG. 16 illustrates an XML Plug-in (com.tbd.jms.server.plug-ins.xml) according to the preferred embodiment. This XML Plug-in 1600 maps the data and events associated with a content document to a JMS topic, using one of several possible JMS application-level protocols. The mapping of content to a specific protocol is accomplished by means of a JMS adapter. When a client application subscribes to a topic mapped to this type of plug-in, it receives a stream of data messages associated with a single document.

The plug-in configuration handles the mapping of topics to instance documents or to templates. An instance mapping associates a specific named topic with a specific named document. A template mapping uses tokens extracted from the topic name to generate the template parameters.

The preferred embodiment provides a mechanism that maps topic name tokens to alternate values, and provides the means to reference the same stream of market data with multiple symbologies, For example, a client application using a Reuters Instrument Code (RIC) might use the topic "equity.ric.IBM.N" while a client application using the Committee on Uniform Securities Identification Procedures (CUSIP) number might use the topic "equity.cusip.459200-10-1.NYSE".

From the perspective of the Data Model, the XML content plug-in, coupled with an implementation of JMS adapter is a type of Distribution Adapter. Referring to FIG. 16, the XMLDestination 1602 is implementation of Destination 1418 allows a consumer to receive events generated by dynamic content 1136. It also allows producers, SessionProducerInterest, to modify, i.e. contribute to, dynamic content. The XMLTopic 1604 is a topic-centric implementation of XMLDestination. The JMSAdapter 1606 is an abstraction for a Component that maps dynamic content to a JMS protocol. The XMLMessageConsumer 1608 is an implementation of the MessageConsumer 1607 abstraction. The XMLTopicSubscriber 1610 is a topic-centric implementation of XMLMessageConsumer. The XMLTopicFactory 1612 is an implementation of SimpleDestinationFactory 1502 that allocates instances of XMLTopic 1604. It interprets a topic name to generate the parameters [using the TokenBasedParameterGenerator 1616] necessary to instantiate dynamic content 1136 from a particular Template 1102 It associates a JMS- Adapter instance with the content and associates the adapter with the an XMLTopic. The JMSAdapterFactory 1614 is an abstraction for Components that allocate a particular type of JMSAdapter.

Another plug-in, com.tbd.jms.server.plug-ins.list, maps a collection of content to a single JMS topic, relying on JMS Adapter instances to map content to a specific JMS protocol. When a client application subscribes to a topic mapped to this type of plug-in, it receives multiple streams of data messages, each associated with a different document instance. The plug-in accesses the list of documents through list source abstraction, and associates each document provided by the list source with an adapter instance. A number of different implementations of the list factory abstraction are possible, including lists generated by data vendors and lists generated by database queries.

Marketfeed-encoded content is mapped to a JMS map message protocol by a plug-in (com.tbd.jms.server.plug-ins.mf), a useful mechanism to expose RMDS Marketfeed content to JMS client applications. Further included are plug-ins that: a) provide implicit conversion of TIBCO Rendezvous messages to Topics with a MapMessage protocol; b) provide implicit conversion of arbitrary JMS providers to Topics and Queues in the preferred embodiment; c) provides implicit conversion of IBM MQSeries queues to Queues according to the preferred embodiment.

Protocol. As depicted in FIG. 17, the invention provides a method for transmission of data between a client-side of the JMS provider (Client) and a server-side JMS provider (Server), where said data is represented to JMS client applications as JMS MapMessages, and where the protocol comprises the steps of:

Step 1 Client requests [Server] permission to publish/subscribe to Destination

Step 2 Server determines a) permission and
b) eligibility of Destination for Optimization Step 3 If not eligible: Client transmits message to Server w/o optimization; if eligible, go to step 4.

Step 4 Message is optimized by the sub steps of:
a) Server determines that Client should use a particular destination-specific dictionary [DSD];
b) Server sends DSD to client session;
c) Client session saves Destination specific dictionary for session-life;
d) Server sends client a reference to DSD for Destination;
e) Client uses reference to associate DSD with Destination;
f) Server sends message to Client using coding implied by dictionary as appropriate to DSD for the particular Destination;
g) Client interprets Server message using meta-data from DSD;
h) Client represents meta-data message to JMS API as MapMessageObjects;
i) Client transmits optimized message to Server; and
j) Server may send to client a new DSD followed by a reference to that DSD for some Destination.

In the inventive architecture, the use of a Destination-Specific Dictionary enables message optimization as follows:
a) For each field that may be present in a MapMessage, the field is assigned an index starting from zero;
b) The dictionary describes the number of fields and the name and type of each field (e.g. string, floating point, long integer, boolean etc);
c) The data portion of an encoded MapMessage is preceded by a variable-length bit-map (a sequence of binary bits);
d) The first bit in each byte is used as a stop bit wherein the presence of a 1 indicates no further bytes in the bitmap.
e) A value of 1 at a particular point or index in the bitmap indicates the presence of an encoded value for the field having the corresponding index in the dictionary.
f) The specific encoding technique and the number of bytes required to represent a particular value will vary depending on the type of the field. The Dictionary is used to determine the decoding technique that must be applied for each value.
g) When full "image" messages are sent, all bits in the bitmap are fully populated, i.e. all bits (except stop bits) being set to 1;
h) When "update" messages are sent the bitmap is sparsely populated, having bits set to 1 only for those indices corresponding to fields in the message.
i) Further, the number of bytes in the bitmap transferred need only be large enough to accommodate the highest field index in the update, rather than the full number of indices in the image.

When this protocol is applied in the context of the a Distribution Adapter associated with the Content Integration Framework or other Plugins the result is a highly efficient distribution protocol that minimizes packet sizes and the processing required to encode, transfer and decode messages. For example, the meta-data that describes the mapping of Managed Content to the MapMessage protocol can order the fields such that fields that update more frequently are represented early in the bitmap whereas those that update less frequently or not at all are represented later in the bitmap, thereby reducing the size of the bitmap sent with updates. Consider that without this mechanism of the inventive architecture each MapMessage would have to convey the name, type, and value of each field in each message.

Content Aware Routing. Notable is the subscription load-balancing performance provided by the invention in a preferred embodiment Various plug-ins supports various types of destination-level redirection or load balancing. [For additional discussion, please refer to the companion patent application cited in the introduction.] As depicted in FIG. 18, RedirectorDestinationFactory 1802, a specialization of SimpleDestinationFactory 1502, creates instances of RedirectDestination 1804 and has a reference to some implementation of the Redirector 1806 abstraction. RedirectDestination 1804, an implementation of Destination 1418, uses the Redirector from the factory to redirect all consumers and subscribers. The Redirector 1806 abstraction encapsulates different types of redirection algorithms. StaticRedirector 1808 is an implementation of Redirector configured to redirect requests to a specific host, port, and Context. When combined with a Mapping Plug-in, this implementation is useful for partitioning servers based on the destination namespace, so, for example, content can be partitioned across multiple servers. Further, the LoadBalancingRedirector 1810 implementation of Redirector monitors a pool of JMS provider implementations that provide equivalent capabilities and redirects requests to different providers based on relative load. The load-balancer and the servers communicate using peer group middleware such as JGroups peer-to-peer communication with a TCP/IP transport [JGRPS]; the servers use JGroups to publish their load-factor. JMS Server Application Configurations. In the preferred embodiment, Server applications defined by this architecture are collections of Components. Runtime configuration governs the precise makeup of a server application. The only required class is an instance of com.tbd.application.Application which uses command line parameters to create an initial Context with a specified resource search path. From that Context the Application then bootstraps itself to create the top-level Components in the system. The Context initializes these Components which, in turn, need other Components and so on. If the Components created during initialization allocate threads then the application runs until all those threads terminate.

TABLE 2

Descriptions of Application/Process Examples

| Application/Process | Description |
| --- | --- |
| JMS Server | The JMS Server product in its simplest configuration is a single application comprised of the JMS server Component, one or more JMS plug-ins, Content Adapters, and, as needed, an HTTP Distribution Adapter. In a few cases, Components will require dedicated threads, e.g. the JMS server input thread, but for the most part processing is divided into tasks that can be assigned to one or more thread pools via the executor construct.<br>For example, an administrator could define an executor and an associated pool of threads to handle one or more Content Adapters and separate executors to handle image requests and update distribution. The administrator can control the number and priority of threads for each executor, fine-tuning the balance between responsiveness, throughput and latency. |
| JMS Load Balancer | The JMS Load Balancer is a stand-alone application using two threads of execution: one for responding to JMS connection requests and the other for handling JGroup messages. |
| JMS Router | The JMS Router process routes JMS messages between a peer group of JMS Servers. It is actually a specialized configuration of the JMS Server that comprises either an XML Content Plug-in, a Standard Plug-in, or both. |
| RMDS Server | The RMDS Server process combines Content Adapters with an RMDS Distribution Adapter. Again, an administrator can make configuration trade-offs between responsiveness, throughput and latency. |

Data View

Content Specification. A Content Specification is a standard XML file that potentially uses multiple namespaces. As described in reference to FIG. 11, a Content Template may use one or more parameters to instantiate Content Instance. Each parameter has one or more substitution points that map the value of the parameter into the instance data. Parameters and substitution points are stored in the XML description of the content template as XML processing instructions. An example of a processing instruction is:
<?PI Some Other Text>

Using standard XML terminology, the "PI" sequence of characters in this example is called the target of the processing instruction and while the "some other text" sequence is called the data of the processing instruction.

This architecture uses processing instruction (PI) construct as follows:

The target is either "parameter" or "substitution."

The data is interpreted as a sequence of attributes expressed as name-value pairs in the form "name='value.'"

A PI with a target "parameter" contains two required attributes—one called "name" the other called "description." The name is unique within a given template. The description attribute is arbitrary descriptive text for human consumption.

A PI with a target "substitution" contains to required name-value pairs—one called "parameter" and the other called path. The value of the parameter attribute must match the name attribute of a parameter PI. The value of the path attribute represents an XPath expression that identifies some node in the document.

The following example shows a template with MFML having two parameters each having one substitution point. The first parameter name is RIC and the value of the parameter will be inserted into the document at the attribute "ric" of the first record element in the "mfml" namespace. The second parameter name is "Service" and has a substitution point at the "service" attribute of the same record element. There is no significance to the string value of the attribute parsed from the template itself. By convention for easy identification the location of the target attribute in the example is parameter name prepended with "$", in this case "$RIC" and "$SERVICE". This example shows a Content Specification with value-added content that links to the previous example. It also accepts two parameters, "RIC" and "Service" where the Ticker parameter has two substitution points and the Exchange parameter has a single substitution point.

```
<?xml version = "1.0" encoding = "UTF-8"?>
<?parameter
    name="Service"
    optional="true"
    description="The RMDS service name"
?>
<?substitution
    parameter='Service'
    path='//mfml:record/attribute::service'
?>
<?parameter
    name="RIC"
    description="The Reuters Instrument Code"
?>
<?substitution
    parameter='RIC'
    path='//mfml:record/attribute::ric'
?>
<mfml:record
    xmlns:mfml = "mfml.content.metafluent.com"
    ric='$RIC'
    service='$SERVICE'
    >
<mfml:integer name="PROD_PERM"/>
<mfml:alphanumeric name="DSPLY_NAME"/>
<mfml:price name="TRDPRC_1"/>
<mfml:price name="NETCHNG_1"/>
<mfml:price name="HIGH_1"/>
<mfml:price name="LOW_1"/>
<mfml:price name="OPEN_PRC"/>
<mfml:price name="HST_CLOSE"/>
<mfml:price name="BID"/>
<mfml:price name="ASK"/>
```

```
        <mfml:integer name="ACVOL_1"/>
        <mfml:integer name="TRDVOL_1"/>
    </mfml:record>
```

Content Adapters. An example of the XML schema for simple content follows.

```
<?xml version="1.0"?>
<?parameter
    name="RIC"
    description="The Reuters Instrument Code"
?>
<?substitution
    parameter='RIC'
    path='//b:link/b:template/b:param[@name="RIC"]/attribute::value'
?>
<?substitution
    parameter='RIC'
    path='//db:table/attribute::keyValue'
?>
<?parameter
    name="Service"
    optional="true"
    description="The RMDS service name"
?>
<?substitution
    parameter='Service'
    path='//b:link/b:template/b:param[@name="Service"]/attribute::value'
?>
<record
    xmlns:b = "basic.content.metafluent.com"
    xmlns:db = "jdbc.content.metafluent.com"
    xmlns:a = "analytics.content.metafluent.com"
    >
    <b:link name='equity'>
        <b:template context = 'com.metafluent.content.demo.rmds'
        uri='mfequity'>
            <b:param name='RIC' value='$ric'/>
            <b:param name='Service' value='$service'/>
        </b:template>
    </b:link>
    <a:subtract name="bid" lhs='/record/b:link#//mfml:price[@name=
    "ASK"]' rhs='/record/b:link#//mfml:price[@name="BID"]'/>
    <db:table connection='stocksdb' name='funds' keyName='ric'
    keyValue='$ric'>
        <db:long name='holdings'/>
    </db:table>
<record>
```

Distribution Adapters. JMS Map Message Distribution. A JMS Map Message Adapter is a Component that needs to be configured or otherwise initialized. The following is an example of XML-based configuration for a map message adapter, configured to operate on the previously discussed example. It illustrates the use of XPath expressions to reference specific content fields in both direct and linked forms.

```
<?xml version="1.0"?> <properties>
    <defaults>
        <boolean name="imageRequired" value="true"/>
        <boolean name="imageRequiredOnUpdate" value="false"/>
        <integer name="imageSize" value="500"/>
        <property name="mapDictionaryCache"
class="com.metafluent.mcontent.distribution.jmsplugin.map.MapDictionaryCache"/>
    </defaults>
    <instance name="fund">
        <map>
            <properties>
                <string name='displayTemplate'
value='com.metafluent.display.demo/templates/fund_layout.xml'/>
            </properties>
            <fields>
                <string name="name"
path='//b:link#/mfml:record/mfml:alphanumeric[@name="DSPLY_NAME"]'/>
                <float name="trade"
path='//b:link#/mfml:record/mfml:price[@name="TRDPRC_1"]'/>
                <float name="net_change"
path='//b:link#/mfml:record/mfml:price[@name="NETCHNG_1"]'/>
                <float name="high"
path='//b:link#/mfml:record/mfml:price[@name="HIGH_1"]'/>
                <float name="low"
path='//b:link#/mfml:record/mfml:price[@name="LOW_1"]'/>
                <float name="open"
path='//b:link#/mfml:record/mfml:price[@name="OPEN_PRC"]'/>
                <float name="close"
path='//b:link#/mfml:record/mfml:price[@name="HST_CLOSE"]'/>
                <float name="bid" path='//b:link#/mfml:record/mfml:price[@name="BID"]'/>
                <float name="ask" path='//b:link#/mfml:record/mfml:price[@name="ASK"]'/>
                <integer name="acc_volume"
path='//b:link#/mfml:record/mfml:integer[@name="ACVOL_1"]'/>
                <integer name="volume"
path='//b:link#/mfml:record/mfml:integer[@name="TRDVOL_1"]'/>
                <long name='holdings' path='//db:table/db:long[@name="holdings"]'
writeable='true'/>
                <float name='spread' path='/record/a:subtract'/>
            </fields>
        </map>
    </instance>
</properties>
</instance>
```

Concluding remarks. The examples of the invention herein are as the invention applies to the financial services market. However, the invention may be implemented in other applications where high volumes of dynamic data, data integration, messaging and transactions are important. The scope of the invention is not limited to the examples or the description of the preferred embodiment, as other embodiments within the scope of the invention will be apparent to those of skill in the related art.

The invention claimed is:

1. A non-transitory computer readable medium having instructions stored thereon that, when executed by a processor on a server, causes the processor to integrate streaming and static data, the instructions comprising:
   receiving a request at a configurable distribution adapter for data expressed by a content template, wherein the content template is derived from an external metadata description comprising one or more schema, wherein the content template is supplied by one or more types of data sources, and each type of data sources is represented by a type of the one or more schema used in the metadata description;
   for each type of schema, accessing a corresponding content adapter;
   wherein the distribution adapter creates a content instance by accessing the content template that comprises a plurality of nodes, wherein each node is either static or dynamic, and each dynamic node is indexed with an index;
   wherein each content template comprises a plurality of parameters and for each parameter a plurality of substitution points;
   for each of the parameters, obtaining values for the parameters and substituting the values into the substitution points, resulting in the content instance of the content template; and encoding and transmitting the data from the content instance.

2. The non-transitory computer readable medium of claim 1, wherein the accessing the content template comprises determining if the content template is located in a cache.

3. The non-transitory computer readable medium of claim 1, wherein the metadata description comprises an Extensible Markup Language (XML) document, and the nodes are referenced by the distribution adapter configuration using an XPath expression.

4. The non-transitory computer readable medium of claim 3, wherein the content template computes and supplies to the distribution adapter a version of the XPath expression optimized for repeated access by converting the XPath to an index-based path using the indices wherein the converting is only performed once.

5. The non-transitory computer readable medium of claim 1, wherein each dynamic node represents dynamic values that require storage in the content instance, and the content instance comprises a set a values for the dynamic nodes and a reference to the content template, and the stored dynamic values can be access by the index associated with dynamic nodes.

6. The non-transitory computer readable medium of claim 5, wherein the static node represents static values that do not require storage in the content instance.

7. The non-transitory computer readable medium of claim 1, wherein the distribution adapter supplies values for the parameters specified by the content template, and the content template builds an identifier for the content instance from the value of the parameters and determines if the content instance is cached.

8. The non-transitory computer readable medium of claim 7, wherein when the content instance is not cached, the template substitutes the values for the parameters into each substitution point and allocates the content instance, the content adapters populate the content from the data sources into the content instance, and the template caches the resulting content instance.

9. The non-transitory computer readable medium of claim 1, wherein the content adapter receives a data event from an external source, generates a pre-event and passes the pre-event to a plurality of registered listeners, modifies one or more dynamic nodes in the content instance, generates a post-event and passes the post-event to the plurality of listeners.

10. The non-transitory computer readable medium of claim 1, wherein the request is received from a Java Messaging Service (JMS) application and comprises one or more topics, and the distribution adapter comprises a JMS server plug-in.

11. The non-transitory computer readable medium of claim 1, wherein the content adapter, in response to a first event from a first external data source that modifies a first dynamic node, generates a change to a different dynamic node within a scope of first pre and post-events associated with the change from the first external data source.

12. The non-transitory computer readable medium of claim 1, further comprising the content template providing a lifecycle support for the content adapter, wherein the lifecycle support comprises initializing the content adapter, allocating required content, maintaining the content by interacting with external systems, and releasing resources when the content is no longer required.

13. The non-transitory computer readable medium of claim 1, wherein the content template interacts with the content adapter to convey an identity of an end- user and allow the content adapter to deny access to content based on that identity.

14. A computer implemented method for integrating streaming and static data, the method comprising:
   receiving a request at a configurable distribution adapter for data expressed by a content template, wherein the content template is derived from an external metadata description comprising one or more schema, wherein the content template is supplied by one or more types of data sources, and each type of data sources is represented by a type of the one or more schema used in the metadata description;
   for each type of schema, accessing a corresponding content adapter;
   wherein the distribution adapter creates a content instance by accessing the content template that comprises a plurality of nodes, wherein each node is either static or dynamic, and each dynamic node is indexed with an index;
   wherein each content template comprises a plurality of parameters and for each parameter a plurality of substitution points;
   for each of the parameters, obtaining values for the parameters and substituting the values into the substitution points, resulting in the content instance of the content template; and
   encoding and transmitting the data from the content instance.

15. The method of claim 14, wherein the accessing the content template comprises determining if the content template is located in a cache.

16. The method of claim 14, wherein the metadata description comprises an Extensible Markup Language (XML)

document, and the nodes are referenced by the distribution adapter configuration using an XPath expression.

17. The method of claim 16, wherein the content template computes and supplies to the distribution adapter a version of the XPath expression optimized for repeated access by converting the XPath to an index-based path using the indices wherein the converting is only performed once.

18. The method of claim 14, wherein each dynamic node represents dynamic values that require storage in the content instance, and the content instance comprises a set a values for the dynamic nodes and a reference to the content template, and the stored dynamic values can be access by the index associated with dynamic nodes.

19. The method of claim 18, wherein the static node represents static values that do not require storage in the content instance.

20. The method of claim 14, wherein the distribution adapter supplies values for the parameters specified by the content template, and the content template builds an identifier for the content instance from the value of the parameters and determines if the content instance is cached.

21. The method of claim 20, wherein when the content instance is not cached, the template substitutes the values for the parameters into each substitution point and allocates the content instance, the content adapters populate the content from the data sources into the content instance, and the template caches the resulting content instance.

22. The method of claim 14, wherein the content adapter receives a data event from an external source, generates a pre-event and passes the pre-event to a plurality of registered listeners, modifies one or more dynamic nodes in the content instance, generates a post-event and passes the post-event to the plurality of listeners.

23. The method of claim 14, wherein the request is received from a Java Messaging Service (JMS) application and comprises one or more topics, and the distribution adapter comprises a JMS server plug-in.

24. A system for integrating streaming and static data, the system comprising:
   a processor;
   a non-transitory computer readable medium coupled to the processor, and comprising instructions that cause the processor to:
   receiving a request at a configurable distribution adapter for data expressed by a content template, wherein the content template is derived from an external metadata description comprising one or more schema, wherein the content template is supplied by one or more types of data sources, and each type of data sources is represented by a type of the one or more schema used in the metadata description;
   for each type of schema, accessing a corresponding content adapter;
   wherein the distribution adapter creates a content instance by accessing the content template that comprises a plurality of nodes, wherein each node is either static or dynamic, and each dynamic node is indexed with an index;
   wherein each content template comprises a plurality of parameters and for each parameter a plurality of substitution points;
   for each of the parameters, obtaining values for the parameters and substituting the values into the substitution points, resulting in the content instance of the content template; and encoding and transmitting the data from the content instance.

25. The system of claim 24, wherein the accessing the content template comprises determining if the content template is located in a cache.

26. The system of claim 24, wherein the metadata description comprises an Extensible Markup Language (XML) document, and the nodes are referenced by the distribution adapter configuration using an XPath expression.

27. The system of claim 24, wherein each dynamic node represents dynamic values that require storage in the content instance, and the content instance comprises a set a values for the dynamic nodes and a reference to the content template, and the stored dynamic values can be access by the index associated with dynamic nodes.

28. The system of claim 24, wherein the distribution adapter supplies values for the parameters specified by the content template, and the content template builds an identifier for the content instance from the value of the parameters and determines if the content instance is cached.

29. The system of claim 28, wherein when the content instance is not cached, the template substitutes the values for the parameters into each substitution point and allocates the content instance, the content adapters populate the content from the data sources into the content instance, and the template caches the resulting content instance.

30. The system of claim 24, wherein the content adapter receives a data event from an external source, generates a pre-event and passes the pre-event to a plurality of registered listeners, modifies one or more dynamic nodes in the content instance, generates a post-event and passes the post-event to the plurality of listeners.

31. The system of claim 24, wherein the request is received from a Java Messaging Service (JMS) application and comprises one or more topics, and the distribution adapter comprises a JMS server plug-in.

* * * * *